United States Patent
Tsuzuki et al.

(10) Patent No.: US 7,239,663 B2
(45) Date of Patent: Jul. 3, 2007

(54) IMAGE CAPTURE AND TRANSMISSION SYSTEM

(75) Inventors: Kengo Tsuzuki, Machida (JP); Toshiaki Shinohara, Omiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 734 days.

(21) Appl. No.: 10/626,567

(22) Filed: Jul. 25, 2003

(65) Prior Publication Data

US 2005/0100101 A1    May 12, 2005

(51) Int. Cl.
*H04B 1/66* (2006.01)
*H04N 7/12* (2006.01)

(52) U.S. Cl. .................................. 375/240.28
(58) Field of Classification Search ...................... None
See application file for complete search history.

(56) References Cited

U.S. PATENT DOCUMENTS

| | | | |
|---|---|---|---|
| 4,943,854 A | | 7/1990 | Shiota et al. |
| 5,229,850 A | | 7/1993 | Toyoshima |
| 5,434,617 A | | 7/1995 | Bianchi |
| 5,612,742 A | * | 3/1997 | Krause et al. ......... 375/240.25 |
| 5,625,410 A | | 4/1997 | Washino et al. |
| 5,712,948 A | * | 1/1998 | Yamada et al. ............... 386/95 |
| 5,841,475 A | | 11/1998 | Kurihara |
| 5,923,384 A | * | 7/1999 | Enomoto et al. ........... 348/705 |
| 6,049,568 A | | 4/2000 | Kagawa |
| 6,282,366 B1 | * | 8/2001 | Oguro et al. ................ 386/104 |
| 6,678,009 B2 | * | 1/2004 | Kahn .......................... 348/569 |
| 6,731,658 B1 | * | 5/2004 | Inazumi et al. ............. 370/537 |
| 6,825,661 B2 | * | 11/2004 | Leussler ..................... 324/318 |
| 6,965,400 B1 | * | 11/2005 | Haba et al. .............. 348/222.1 |
| 2001/0002225 A1 | * | 5/2001 | Sekine et al. .................. 395/55 |

FOREIGN PATENT DOCUMENTS

| | | |
|---|---|---|
| EP | 0710028 | 5/1996 |
| EP | 0776130 A2 | 5/1997 |
| JP | 9-130655 | 5/1997 |
| JP | 10040185 | 2/1998 |
| JP | 10108157 | 4/1998 |
| JP | 10-164504 | 6/1998 |
| JP | 10155132 | 6/1998 |
| WO | WO 9605677 | 2/1996 |

* cited by examiner

*Primary Examiner*—Nhon Diep
(74) *Attorney, Agent, or Firm*—Louis Woo

(57) ABSTRACT

An image capture and transmission system includes first and second imaging devices. A timing signal generator produces a timing signal. A common drive circuit operates for driving the first and second imaging devices at equal timings determined by the timing signal. A first signal processor operates for converting an output signal of the first imaging device into first digital video data. A second signal processor operates for converting an output signal of the second imaging device into second digital video data. The first digital video data and the second digital video data are processed into a stream of packets. The packet stream is transmitted to, for example, a network.

5 Claims, 12 Drawing Sheets

IMAGE CAPTURE AND TRANSMISSION SYSTEM

BACKGROUND OF THE INVENTION

1. Field of the Invention

This invention relates to a system including an image capturing section and an image-information transmitting section.

2. Description of the Related Art

It is conceivable to provide first and second imaging devices, and to transmit image information pieces from the first and second imaging devices to a common network. Such a conceivable system includes first and second timing signal generators, and first and second drive circuits for the first and second imaging devices respectively. The first drive circuit operates the first imaging device in response to an output signal of the first timing signal generator. The second drive circuit operates the second imaging device in response to an output signal of the second timing signal generator.

The conceivable system also includes first and second signal processors, and first and second transmitters. The first signal processor converts an output signal of the first imaging device into first video data. The first transmitter encodes the first video data into a first stream of packets. The first transmitter outputs the first packet stream to the network while using a first band and a first channel. On the other hand, the second signal processor converts an output signal of the second imaging device into second video data. The second transmitter encodes the second video data into a second stream of packets. The second transmitter outputs the second packet stream to the network while using a second band and a second channel different from the first band and the first channel.

The conceivable system tends to be complicated in structure since there are the two timing signal generators, the two drive circuits, and the two transmitters.

SUMMARY OF THE INVENTION

It is an object of this invention to provide an image capture and transmission system having a simple structure.

A first aspect of this invention provides an image capture and transmission system comprising first and second imaging devices; first means for generating a timing signal; a common drive circuit for driving the first and second imaging devices at equal timings determined by the timing signal generated by the first means; a first signal processor for converting an output signal of the first imaging device into first digital video data; a second signal processor for converting an output signal of the second imaging device into second digital video data; second means for processing the first digital video data and the second digital video data into a stream of packets; and third means for transmitting the packet stream generated by the second means.

A second aspect of this invention is based on the first aspect thereof, and provides an image capture and transmission system further comprising a third imaging device, and a drive circuit for driving the third imaging device at a timing different from the timings of drive of the first and second imaging devices.

A third aspect of this invention is based on the first aspect thereof, and provides an image capture and transmission system wherein the third means comprises means for outputting the packets in the stream to a network, and the first means comprises means for generating the timing signal synchronized with the outputting of the packets to the network.

A fourth aspect of this invention is based on the first aspect thereof, and provides an image capture and transmission system further comprising means for setting a changeable transmission start point in every frame represented by the first digital video data and the second digital video data, and means for enabling the transmission of the first digital video data and the second digital video data in the packet stream by the third means to start at the transmission start point for every frame represented by the first digital video data and the second digital video data.

A fifth aspect of this invention is based on the first aspect thereof, and provides an image capture and transmission system further comprising means provided in the third means for re-transmitting a portion of the packet stream in response to a signal of a re-transmission request.

A sixth aspect of this invention is based on the first aspect thereof, and provides an image capture and transmission system further comprising means provided in the third means for re-transmitting a whole of the first digital video data and the second digital video data in the packet stream.

A seventh aspect of this invention is based on the first aspect thereof, and provides an image capture and transmission system wherein the second means comprises means for compressing the first digital video data into first compression-resultant digital video data, means for compressing the second digital video data into second compression-resultant digital video data, and means for combining the first compression-resultant digital video data and the second compression-resultant digital video data into the packet stream.

An eighth aspect of this invention is based on the first aspect thereof, and provides an image capture and transmission system wherein the second means comprises means for executing a first calculative operation between the first digital video data and the second digital video data, and generating first operation-resultant digital video data, means for executing a second calculative operation between the first digital video data and the second digital video data, and generating second operation-resultant digital video data, the second calculative operation being different from the first calculative operation, means for compressing the first operation-resultant digital video data into first compression-resultant digital video data, means for compressing the second operation-resultant digital video data into second compression-resultant digital video data, and means for combining the first compression-resultant digital video data and the second compression-resultant digital video data into the packet stream.

A ninth aspect of this invention is based on the first aspect thereof, and provides an image capture and transmission system wherein the second means comprises means for setting a changeable effective region in every frame represented by the first digital video data and the second digital video data, means for selecting portions of the first digital video data and the second digital video data which correspond to the effective region in every frame, and means for placing only the selected portions of the first digital video data and the second digital video data in the packet stream.

A tenth aspect of this invention is based on the ninth aspect thereof, and provides an image capture and transmission system wherein the effective region in every frame is rectangular, and extends between horizontal limit positions and extends between vertical limit positions.

An eleventh aspect of this invention is based on the ninth aspect thereof, and provides an image capture and transmission system further comprising means for searching every frame represented by the first digital video data and the second digital video data for a predetermined target object, and means for changing the effective region in every frame in response to a result of the searching.

A twelfth aspect of this invention is based on the ninth aspect thereof, and provides an image capture and transmission system further comprising means for sensing a specified object in every frame represented by the first digital video data and the second digital video data, and generating information of a result of the sensing, means provided in the second means for automatically setting the effective region in every frame in accordance with a variable setting condition, and means for deciding the setting condition in response to the information of the result of the sensing.

A thirteenth aspect of this invention is based on the ninth aspect thereof, and provides an image capture and transmission system further comprising means for sensing a specified object in every frame represented by the first digital video data and the second digital video data, and generating information of a result of the sensing, and means for changing the effective region in every frame in response to the information of the result of the sensing.

DESCRIPTION OF THE PREFERRED EMBODIMENTS

First Embodiment

Figure 1:
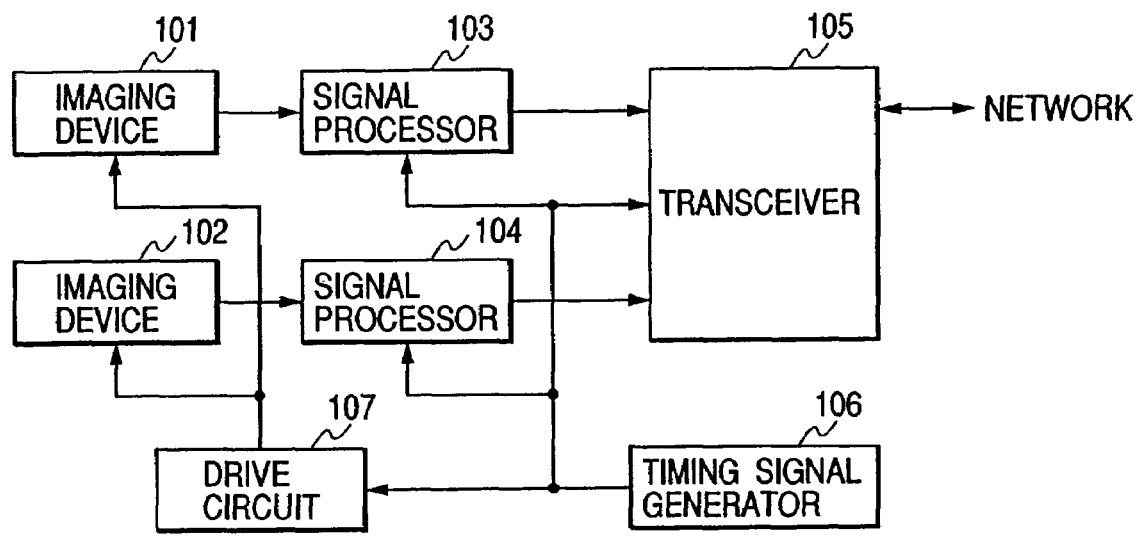
FIG. 1 is a block diagram of an image capture and transmission system according to a first embodiment of this invention.

FIG. 1 shows an image capture and transmission system according to a first embodiment of this invention. The system of FIG. 1 includes imaging devices (image sensors) 101 and 102, signal processors 103 and 104, a transceiver (a transmitter/receiver) 105, a timing signal generator 106, and a drive circuit 107.

The imaging device 101 is sequentially followed by the signal processor 103 and the transceiver 105. The imaging device 102 is sequentially followed by the signal processor 104 and the transceiver 105. The timing signal generator 106 is connected to the signal processors 103 and 104, the transceiver 105, and the drive circuit 107. The drive circuit 107 is connected to the imaging devices 101 and 102. The transceiver 105 is connected to a network including, for example, an IEEE 1394 serial bus.

The device 106 generates a timing signal. As will be indicated later, the timing signal generated by the device 106 includes a set of sub timing signals being a clock signal, a horizontal sync signal, and a vertical sync signal. The device 106 outputs the generated timing signal to the signal processors 103 and 104, the transceiver 105, and the drive circuit 107.

The drive circuit 107 generates a common drive signal for the imaging devices 101 and 102 in response to the output signal of the timing signal generator 106. The drive circuit 107 outputs the drive signal to the imaging devices 101 and 102. Accordingly, the drive circuit 107 operates or drives the imaging devices 101 and 102 at equal timings determined by the output signal of the timing signal generator 106.

The imaging device 101 converts an image into a corresponding analog video signal in response to the output signal of 1 5 the drive circuit 107. In other words, the imaging device 101 implements image capture in response to the output signal of the drive circuit 107. The imaging device 101 outputs the analog video signal to the signal processor 103.

The imaging device 102 converts an image into a corresponding analog video signal in response to the output signal of the drive circuit 107. In other words, the imaging device 102 implements image capture in response to the output signal of the drive circuit 107. The imaging device 102 outputs the analog video signal to the signal processor 104.

The image capture by the imaging device 101 and the image capture by the imaging device 102 periodically occur at equal timings determined by the output signal of the drive circuit 107.

The signal processor 103 converts the output signal of the imaging device 101 into a first digital video signal in response to the output signal of the timing signal generator 106. The first digital video signal is also referred to as the first video data. The signal processor 103 outputs the first video data to the transceiver 105.

The signal processor 104 converts the output signal of the imaging device 102 into a second digital video signal in response to the output signal of the timing signal generator 106. The second digital video signal is also referred to as the second video data. The signal processor 104 outputs the second video data to the transceiver 105.

The transceiver 105 includes a packet encoder which converts or encodes the first video data and the second video data into a stream of packets in response to the output signal of the timing signal generator 106. The transceiver 105 outputs the packet stream to the network.

The transceiver 105 is able to receive asynchronous packets from the network. The transceiver 105 converts or decodes the received asynchronous packets into information pieces carried thereby.

Figure 2:
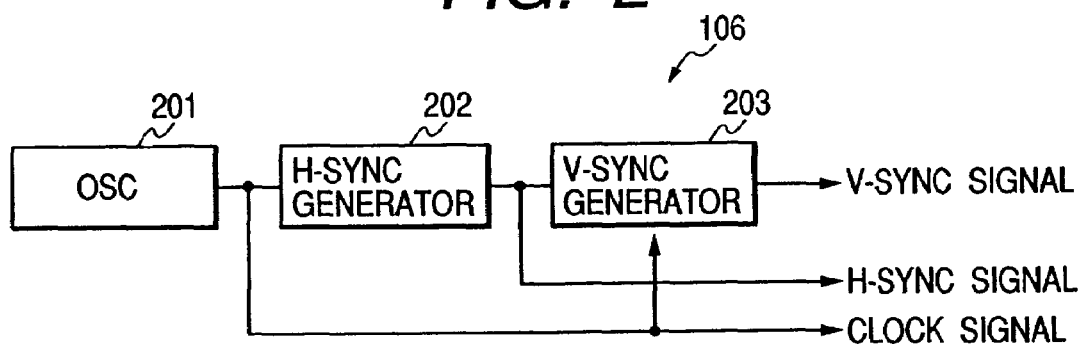
FIG. 2 is a block diagram of a timing signal generator in FIG. 1.

As shown in FIG. 2, the timing signal generator 106 includes an oscillation circuit 201, a horizontal sync signal generator 202, and a vertical sync signal generator 203. The oscillation circuit 201 is connected to the horizontal sync signal generator 202 and the vertical sync signal generator 203. The horizontal sync signal generator 202 is connected to the vertical sync signal generator 203.

The oscillation circuit 201 generates a clock signal having a predetermined frequency. The oscillation circuit 201 outputs the clock signal to the horizontal sync signal generator 202 and the vertical sync signal generator 203. The device 202 generates a horizontal sync signal in response to the clock signal. The horizontal sync signal generator 202 includes, for example, a counter responsive to the clock signal. The device 202 outputs the horizontal sync signal to the vertical sync signal generator 203. The device 203 generates a vertical sync signal in response to the clock signal and the horizontal sync signal. The vertical sync signal generator 203 includes, for example, a counter responsive to the clock signal and the horizontal sync signal. The oscillation circuit 201, the horizontal sync signal generator 202, and the vertical sync signal generator 203 output the clock signal, the horizontal sync signal, and the vertical sync signal which are sub timing signals composing the timing signal generated by and outputted from the timing signal generator 106.

Figure 3:
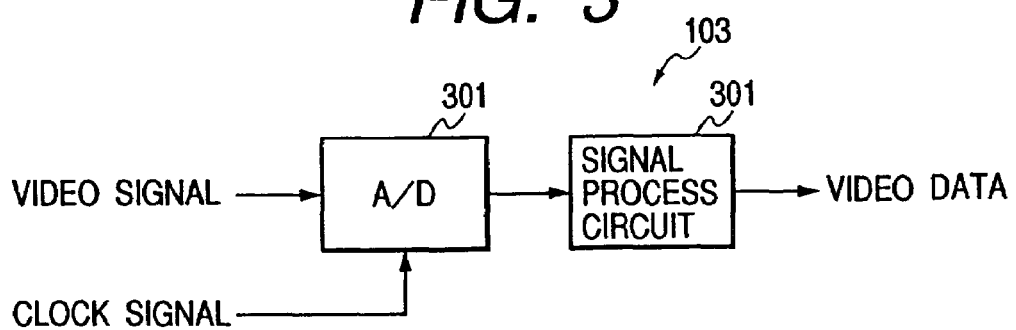
FIG. 3 is a block diagram of a signal processor in FIG. 1.

The signal processors 103 and 104 have structures similar to each other. Accordingly, only the signal processor 103 will be explained in detail. As shown in FIG. 3, the signal processor 103 includes an A/D (analog-to-digital) conversion circuit 301 and a signal processing circuit 302. The A/D conversion circuit 301 is connected to the imaging device 101 (see FIG. 1), the timing signal generator 106 (see FIG. 1), and the signal processing circuit 302. The signal processing circuit 302 is connected to the transceiver 105 (see FIG. 1).

The A/D conversion circuit 301 subjects the output signal of the imaging device 101 to analog-to-digital conversion in response to the clock signal fed from the timing signal generator 106. Accordingly, the A/D conversion circuit 301 changes the output signal of the imaging device 101 into a corresponding digital video signal. The A/D conversion circuit 301 outputs the digital video signal to the signal processing circuit 302. The signal processing circuit 302 subjects the output signal of the A/D conversion circuit 301 to level conversion and format conversion, thereby changing the output signal of the A/D conversion circuit 301 into first video data of a given format. The signal processing circuit 302 outputs the first video data to the transceiver 105.

Figure 4:
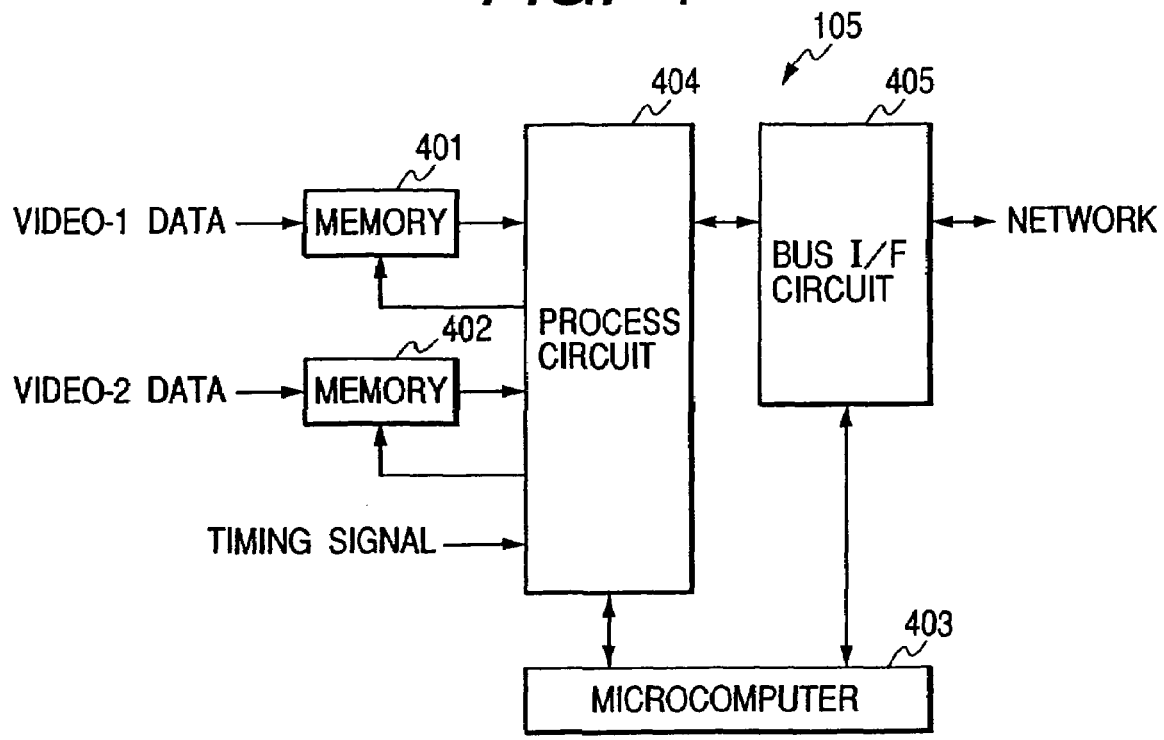
FIG. 4 is a block diagram of a transceiver in FIG. 1.

As shown in FIG. 4, the transceiver 105 includes memories 401 and 402, a microcomputer 403, a processing circuit 404, and a bus I/F (interface) circuit 405. The memory 401 is connected to the signal processor 103 (see FIG. 1) and the processing circuit 404. The memory 402 is connected to the signal processor 104 (see FIG. 1) and the processing circuit 404. The processing circuit 404 is connected to the timing signal generator 106 (see FIG. 1) and the bus I/F circuit 405. The bus I/F circuit 405 is connected to the network. The microcomputer 403 is connected to the processing circuit 404 and the bus I/F circuit 405.

The first video data outputted from the signal processor 103 is stored into the memory 401. The second video data outputted from the signal processor 104 is stored into the memory 402. The microcomputer 403 controls the processing circuit 404 and the bus I/F circuit 405 in accordance with a program stored therein. The program is designed to implement the following processes. The processing circuit 404 reads out the first video data and the second video data from the memories 401 and 402 at given timings determined by the output signal of the timing signal generator 106. The processing circuit 404 includes a packet encoder which converts or encodes the first video data and the second video data into a stream of packets in response to the output signal of the timing signal generator 106. For example, every packet is loaded with at least one of a portion of the first video data and a portion of the second video data. Preferably, every packet contains an added information piece representing the format of the video data therein, an added information piece representing the identification number for the imaging device which causes the video data therein, and an added information piece representing the position of an image portion represented by the video data therein. The processing circuit 404 outputs the packet stream to the bus I/F circuit 405. The bus I/F circuit 405 outputs the packet stream to the network.

The microcomputer 403 can transmit and receive asynchronous packets to and from an external apparatus via the network and the bus I/F circuit 405.

Figure 5:
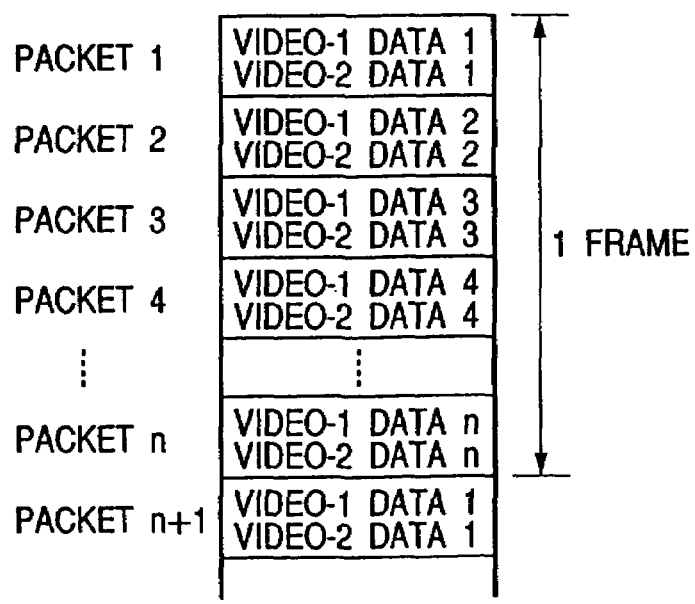
FIG. 5 is a diagram of packets, and video data pieces placed in the packets in the system of FIG. 1.

Operation of the processing circuit 404 will be explained in more detail. For every frame, the processing circuit 404 divides the first video data into "n" pieces (video-1 data pieces) where "n" denotes a predetermined natural number. As shown in FIG. 5, the processing circuit 404 sequentially assigns the "n" video-1 data pieces to "n" packets, respectively. For every frame, the processing circuit 404 divides the second video data into "n" pieces (video-2 data pieces). As shown in FIG. 5, the processing circuit 404 sequentially assigns the "n" video-2 data pieces to the "n" packets, respectively. Accordingly, as shown in FIG. 5, every packet is loaded with a pair of a video-1 data piece and a video-2 data piece.

Second Embodiment

A second embodiment of this invention is similar to the first embodiment thereof except for design changes indicated hereinafter.

Figure 6:
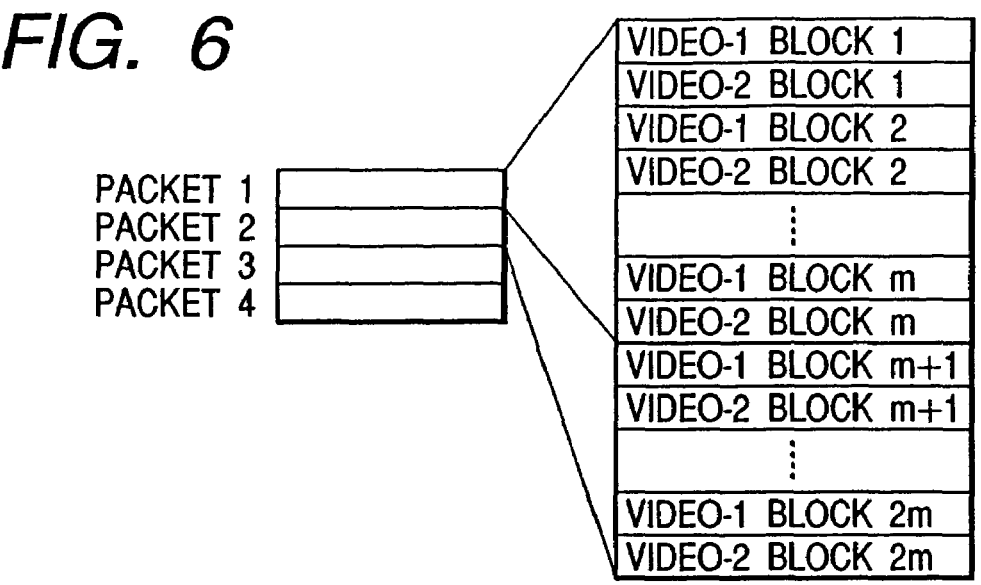
FIG. 6 is a diagram of packets, and video data blocks placed in the packets in an image capture and transmission system according to a second embodiment of this invention.

In the second embodiment of this invention, the processing circuit 404 (see FIG. 4) operates as follows. For every frame, the processing circuit 404 divides the first video data into "2m" blocks (video-1 data blocks) where "m" denotes a predetermined natural number. As shown in FIG. 6, the processing circuit 404 assigns former video-1 data blocks (first to m-th video-1 data blocks) among the "2m" video-1 data blocks to a first packet. The processing circuit 404 assigns latter video-1 data blocks (m+1-th to 2m-th video-1 data blocks) among the "2m" video-1 data blocks to a second packet. For every frame, the processing circuit 404 divides the second video data into "2m" blocks (video-2 data blocks). As shown in FIG. 6, the processing circuit 404 assigns former video-2 data blocks (first to m-th video-2 data blocks) among the "2m" video-2 data blocks to the first packet. The processing circuit 404 assigns latter video-2 data blocks (m+1-th to 2m-th video-2 data blocks) among the "2m" video-1 data blocks to the second packet. As shown in FIG. 6, in each of the first and second packets, the video-1 data blocks positionally alternate with the video-2 data blocks.

Third Embodiment

A third embodiment of this invention is similar to the first embodiment thereof except for design changes indicated hereinafter.

Figure 7:
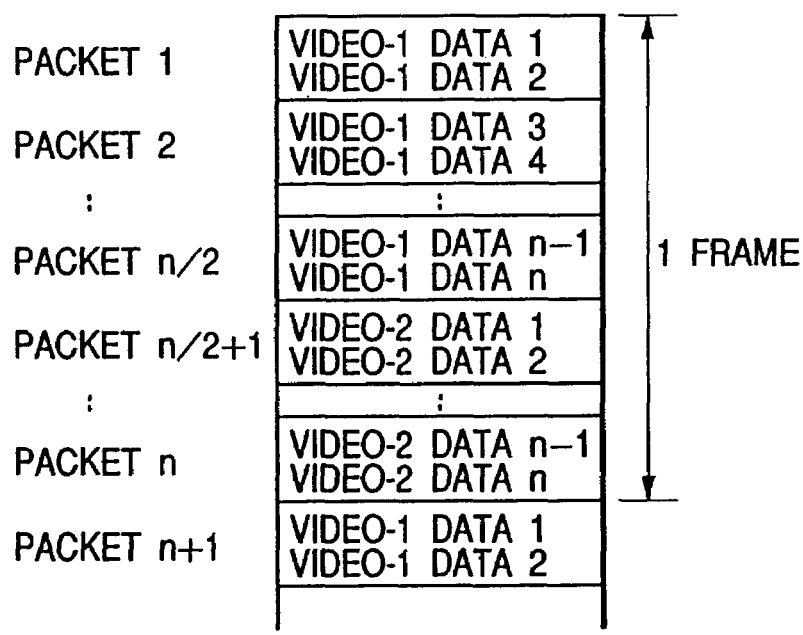
FIG. 7 is a diagram of packets, and video data pieces placed in the packets in an image capture and transmission system according to a third embodiment of this invention.

In the third embodiment of this invention, the processing circuit 404 (see FIG. 4) operates as follows. For every frame, the processing circuit 404 divides the first video data into "n" pieces (video-1 data pieces) where "n" denotes a predetermined natural number. The processing circuit 404 groups the "n" video-1 data pieces into "n/2" sets each having two successive video-1 data pieces. As shown in FIG. 7, the processing circuit 404 sequentially assigns the "n/2" sets to former packets (first to n/2-th packets), respectively. Accordingly, as shown in FIG. 7, each of the former packets (the first to n/2-th packets) is loaded with two successive video-1 data pieces. For every frame, the processing circuit 404 divides the second video data into "n" pieces (video-2 data pieces). The processing circuit 404 groups the "n" video-2 data pieces into "n/2" sets each having two successive video-2 data pieces. As shown in FIG. 7, the processing circuit 404 sequentially assigns the "n/2" sets to latter packets (n/2+1-th to n-th packets), respectively. Accordingly, as shown in FIG. 7, each of the latter packets (the n/2+1-th to n-th packets) is loaded with two successive video-2 data pieces.

Fourth Embodiment

A fourth embodiment of this invention is similar to the first embodiment thereof except for design changes indicated hereinafter.

Figure 8:
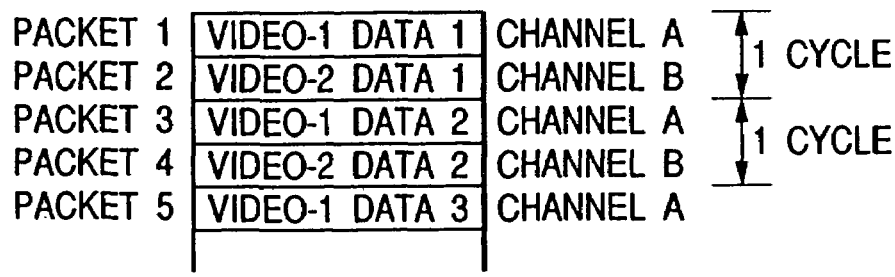
FIG. 8 is a diagram of packets, and first video data and second video data placed in the packets in an image capture and transmission system according to a fourth embodiment of this invention.

In the fourth embodiment of this invention, the processing circuit 404 (see FIG. 4) and the bus I/F circuit 405 (see FIG. 4) operate as follows. The processing circuit 404 converts or encodes the first video data (the video-1 data) into a first stream of packets. The processing circuit 404 converts or encodes the second video data (the video-2 data) into a second stream of packets. The processing circuit 404 outputs the first and second packet streams to the bus I/F circuit 405. As shown in FIG. 8, the bus I/F circuit 405 outputs the first packet stream to a first channel (a channel-A) of the network. The bus I/F circuit 405 outputs the second packet stream to a second channel (a channel-B) of the network. The second channel differs from the first channel. As shown in FIG. 8, for every cycle, one packet containing a portion of the video-1 data and one packet containing a portion of the video-2 data are transmitted from the bus I/F circuit 405 to the network.

Fifth Embodiment

Figure 9:
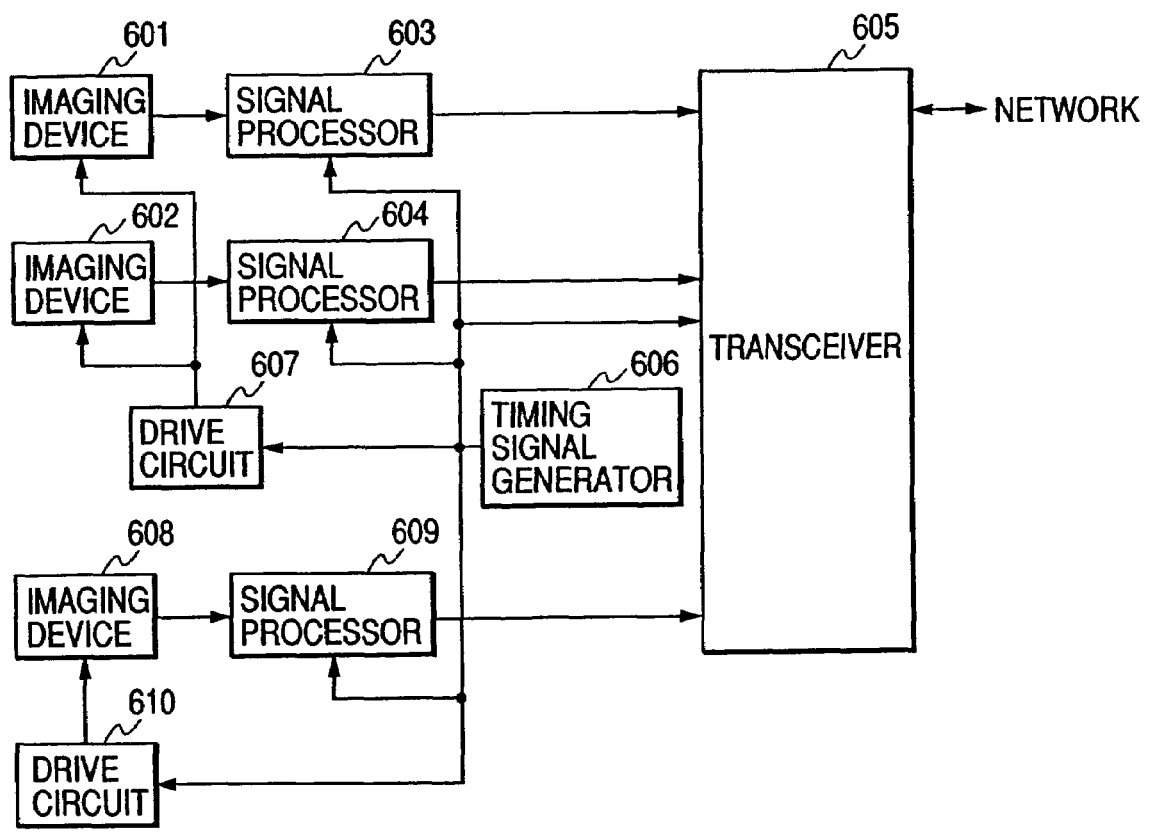
FIG. 9 is a block diagram of an image capture and transmission system according to a fifth embodiment of this invention.

FIG. 9 shows an image capture and transmission system according to a fifth embodiment of this invention. The system of FIG. 9 includes imaging devices (image sensors) 601, 602, and 608, signal processors 603, 604, and 609, a transceiver (a transmitter/receiver) 605, a timing signal generator 606, and drive circuits 607 and 610.

The imaging device 601 is sequentially followed by the signal processor 603 and the transceiver 605. The imaging device 602 is sequentially followed by the signal processor 604 and the transceiver 605. The imaging device 608 is sequentially followed by the signal processor 609 and the transceiver 605. The timing signal generator 606 is connected to the signal processors 603, 604, and 609, the transceiver 605, and the drive circuits 607 and 610. The drive circuit 607 is connected to the imaging devices 601 and 602. The drive circuit 610 is connected to the imaging device 608. The transceiver 605 is connected to a network including, for example, an IEEE 1394 serial bus.

The imaging device 601, the imaging device 602, the signal processor 603, the signal processor 604, the timing signal generator 606, and the drive circuit 607 are similar to the imaging device 101, the imaging device 102, the signal processor 103, the signal processor 104, the timing signal generator 106, and the drive circuit 107 in FIG. 1, respectively.

The device 606 generates a timing signal. The timing signal generated by the device 606 includes a set of sub timing signals being a clock signal, a horizontal sync signal, and a vertical sync signal. The device 606 outputs the generated timing signal to the signal processors 603, 604, and 609, the transceiver 605, and the drive circuits 607 and 610.

The drive circuit 607 generates a common drive signal for the imaging devices 601 and 602 in response to the output signal of the timing signal generator 606. The drive circuit 607 outputs the drive signal to the imaging devices 601 and 602. Accordingly, the drive circuit 607 operates or drives the imaging devices 601 and 602 at equal timings determined by the output signal of the timing signal generator 606.

The drive circuit 610 generates a drive signal for the imaging device 608 in response to the output signal of the timing signal generator 606. The drive circuit 610 outputs the drive signal to the imaging device 608. The drive signal for the imaging device 608 provides a timing different from a timing provided by the drive signal for the imaging devices 601 and 602. Accordingly, the drive circuit 610 operates or drives the imaging device 608 at a timing different from the timing of drive of the imaging devices 601 and 602.

The imaging device 601 converts an image into a corresponding analog video signal in response to the output signal of the drive circuit 607. In other words, the imaging device 601 implements image capture in response to the output signal of the drive circuit 607. The imaging device 601 outputs the analog video signal to the signal processor 603.

The imaging device 602 converts an image into a corresponding analog video signal in response to the output signal of the drive circuit 607. In other words, the imaging device 602 implements image capture in response to the output signal of the drive circuit 607. The imaging device 602 outputs the analog video signal to the signal processor 604.

The image capture by the imaging device 601 and the image capture by the imaging device 602 periodically occur at equal timings determined by the output signal of the drive circuit 607.

The imaging device 608 converts an image into a corresponding analog video signal in response to the output signal of the drive circuit 610. In other words, the imaging device 608 implements image capture in response to the output signal of the drive circuit 610. The imaging device 608 outputs the analog video signal to the signal processor 609.

The image capture by the imaging device 608 periodically occurs to a timing which is determined by the output signal of the drive circuit 610, and which differs from the timing of the image capture by each of the imaging devices 601 and 602.

The signal processor 603 converts the output signal of the imaging device 601 into a first digital video signal in response to the output signal of the timing signal generator 606. The first digital video signal is also referred to as the first video data. The signal processor 603 outputs the first video data to the transceiver 605.

The signal processor 604 converts the output signal of the imaging device 602 into a second digital video signal in response to the output signal of the timing signal generator 606. The second digital video signal is also referred to as the second video data. The signal processor 604 outputs the second video data to the transceiver 605.

The signal processor 609 converts the output signal of the imaging device 608 into a third digital video signal in response to the output signal of the timing signal generator 606. The third digital video signal is also referred to as the third video data. The signal processor 609 outputs the third video data to the transceiver 605.

The transceiver 605 includes a packet encoder which converts or encodes the first video data, the second video data, and the third video data into a stream of packets in response to the output signal of the timing signal generator 606. Every packet is loaded with at least one of a portion of the first video data, a portion of the second video data, and a portion of the third video data. The transceiver 605 outputs the packet stream to the network.

The transceiver 605 is able to receive asynchronous packets from the network. The transceiver 605 converts or decodes the received asynchronous packets into information pieces carried thereby.

Sixth Embodiment

Figure 10:
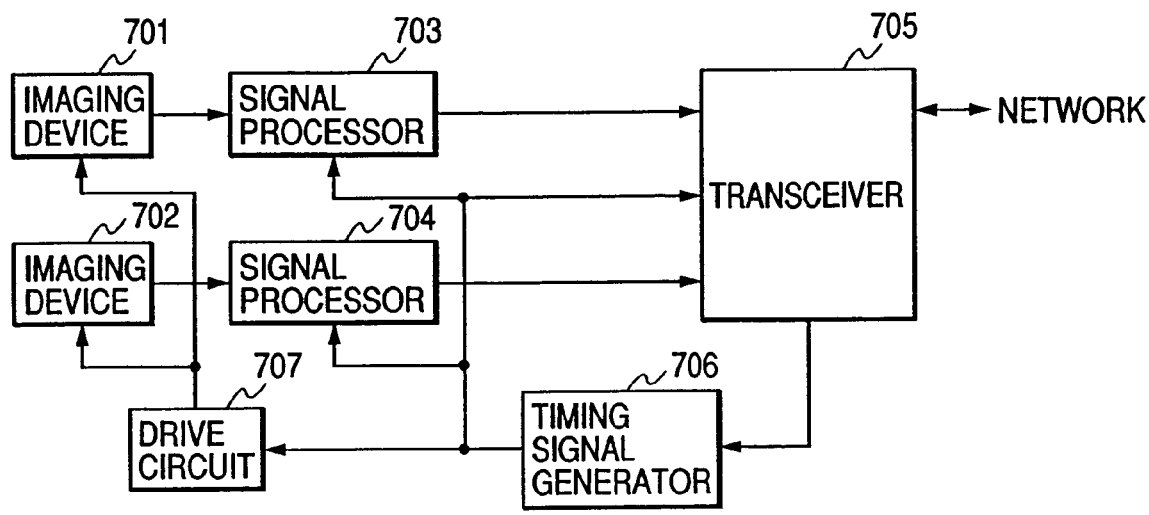
FIG. 10 is a block diagram of an image capture and transmission system according to a sixth embodiment of this invention.

FIG. 10 shows an image capture and transmission system according to a sixth embodiment of this invention. The system of FIG. 10 includes imaging devices (image sensors) 701 and 702, signal processors 703 and 704, a transceiver (a transmitter/receiver) 705, a timing signal generator 706, and a drive circuit 707.

The imaging device 701 is sequentially followed by the signal processor 703 and the transceiver 705. The imaging device 702 is sequentially followed by the signal processor 704 and the transceiver 705. The timing signal generator 706 is connected to the signal processors 703 and 704, the transceiver 705, and the drive circuit 707. The drive circuit 707 is connected to the imaging devices 701 and 702. The transceiver 705 is connected to a network including, for example, an IEEE 1394 serial bus.

The imaging device 701, the imaging device 702, the signal processor 703, the signal processor 704, and the drive circuit 707 are similar to the imaging device 101, the imaging device 102, the signal processor 103, the signal processor 104, and the drive circuit 107 in FIG. 1, respectively.

A cycle start packet (CSP) is periodically transmitted in the network. The transceiver 705 receives every cycle start packet from the network. The transceiver 705 generates a communication sync signal in response to the received cycle start packets. The communication sync signal is synchronized with the received cycle start packets. The transceiver 705 outputs the communication sync signal to the timing signal generator 706.

The device 706 generates a timing signal in response to the communication sync signal fed from the transceiver 705. As will be indicated later, the timing signal generated by the device 706 includes a set of sub timing signals being a clock signal, a horizontal sync signal, and a vertical sync signal. The device 706 outputs the generated timing signal to the signal processors 703 and 704, the transceiver 705, and the drive circuit 707.

The drive circuit 707 generates a common drive signal for the imaging devices 701 and 702 in response to the output signal of the timing signal generator 706. The drive circuit 707 outputs the drive signal to the imaging devices 701 and 702. Accordingly, the drive circuit 707 operates or drives the imaging devices 701 and 702 at equal timings determined by the output signal of the timing signal generator 706.

The imaging device 701 converts an image into a corresponding analog video signal in response to the output signal of the drive circuit 707. In other words, the imaging device 701 implements image capture in response to the output signal of the drive circuit 707. The imaging device 701 outputs the analog video signal to the signal processor 703.

The imaging device 702 converts an image into a corresponding analog video signal in response to the output signal of the drive circuit 707. In other words, the imaging device 702 implements image capture in response to the output signal of the drive circuit 707. The imaging device 702 outputs the analog video signal to the signal processor 704.

The image capture by the imaging device 701 and the image capture by the imaging device 702 periodically occur at equal timings determined by the output signal of the drive circuit 707.

The signal processor 703 converts the output signal of the imaging device 701 into a first digital video signal in response to the output signal of the timing signal generator 706. The first digital video signal is also referred to as the first video data. The signal processor 703 outputs the first video data to the transceiver 705.

The signal processor 704 converts the output signal of the imaging device 702 into a second digital video signal in response to the output signal of the timing signal generator 706. The second digital video signal is also referred to as the second video data. The signal processor 704 outputs the second video data to the transceiver 705.

The transceiver 705 includes a packet encoder which converts or encodes the first video data and the second video data into a stream of packets in response to the output signal of the timing signal generator 706. The transceiver 705 outputs the packet stream to the network.

The transceiver 705 is able to receive asynchronous packets from the network. The transceiver 705 converts or decodes the received asynchronous packets into information pieces carried thereby.

Figure 11:
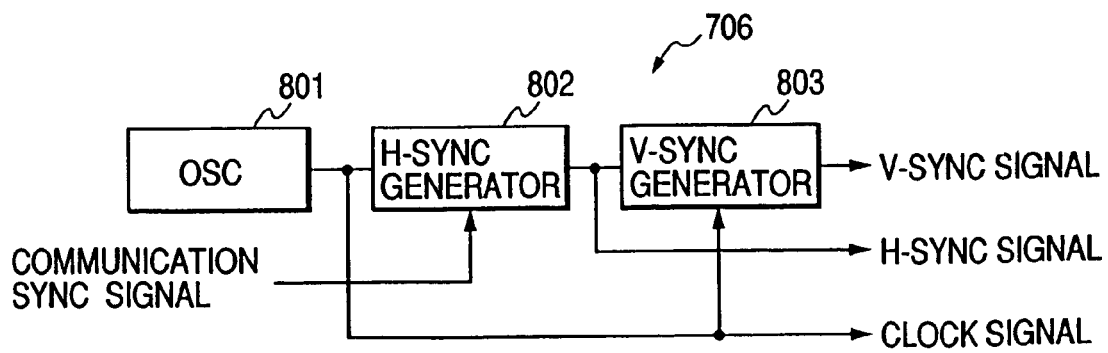
FIG. 11 is a block diagram of a timing signal generator in FIG. 10.

As shown in FIG. 11, the timing signal generator 706 includes an oscillation circuit 801, a horizontal sync signal generator 802, and a vertical sync signal generator 803. The oscillation circuit 801 is connected to the horizontal sync signal generator 802 and the vertical sync signal generator 803. The horizontal sync signal generator 802 is connected to the transceiver 705 (see FIG. 10) and the vertical sync signal generator 803.

The oscillation circuit 801 generates a clock signal having a predetermined frequency. The oscillation circuit 801 outputs the clock signal to the horizontal sync signal generator 802 and the vertical sync signal generator 803. The horizontal sync signal generator 802 receives the communication sync signal from the transceiver 705. The device 802 generates a horizontal sync signal in response to the clock signal and the communication sync signal. Preferably, the horizontal sync signal is synchronized with the communication sync signal. The horizontal sync signal generator 802 includes, for example, a counter responsive to the clock signal and the communication sync signal. The device 802 outputs the horizontal sync signal to the vertical sync signal generator 803. The device 803 generates a vertical sync signal in response to the clock signal and the horizontal sync signal. The vertical sync signal generator 803 includes, for example, a counter responsive to the clock signal and the horizontal sync signal. The oscillation circuit 801, the horizontal sync signal generator 802, and the vertical sync signal generator 803 output the clock signal, the horizontal sync signal, and the vertical sync signal which are sub timing signals composing the timing signal generated by and outputted from the timing signal generator 706.

Figure 12:
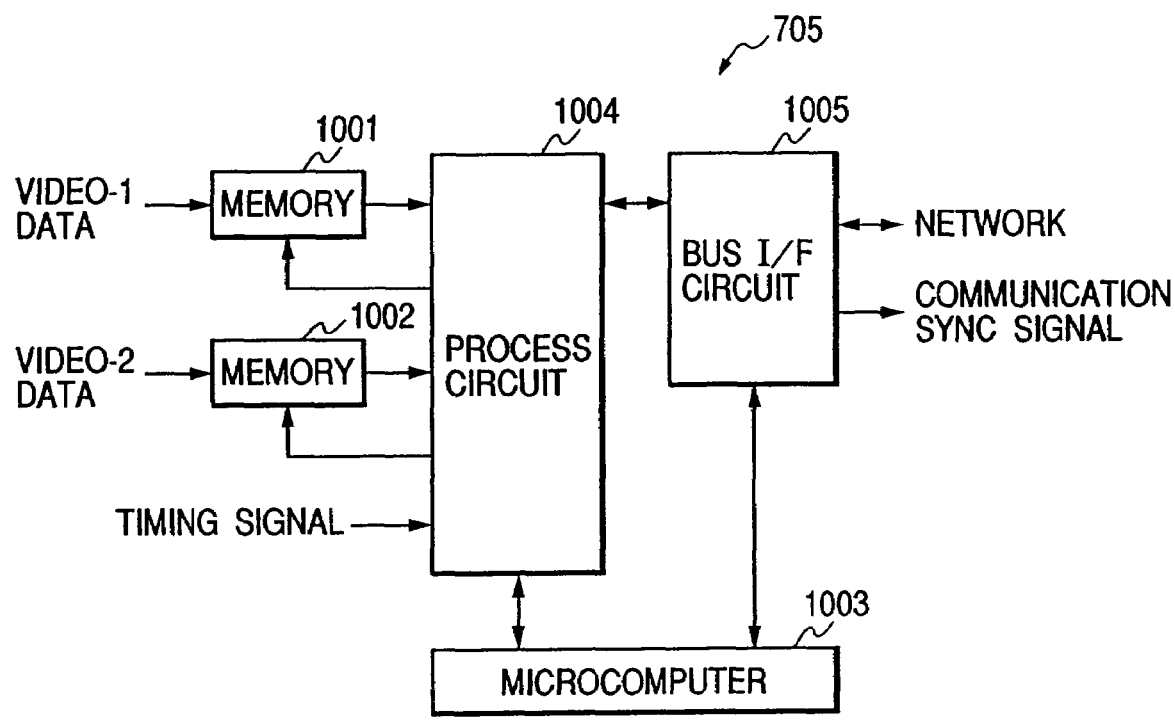
FIG. 12 is a block diagram of a transceiver in FIG. 10.

As shown in FIG. 12, the transceiver 705 includes memories 1001 and 1002, a microcomputer 1003, a processing circuit 1004, and a bus I/F (interface) circuit 1005. The memory 1001 is connected to the signal processor 703 (see FIG. 10) and the processing circuit 1004. The memory 1002 is connected to the signal processor 704 (see FIG. 10) and the processing circuit 1004. The processing circuit 1004 is connected to the timing signal generator 706 (see FIG. 10) and the bus I/F circuit 1005. The bus I/F circuit 1005 is connected to the network. The microcomputer 1003 is connected to the processing circuit 1004 and the bus I/F circuit 1005.

The first video data outputted from the signal processor 703 is stored into the memory 1001. The second video data outputted from the signal processor 704 is stored into the memory 1002. The microcomputer 1003 controls the processing circuit 1004 and the bus I/F circuit 1005 in accordance with a program stored therein. The program is designed to implement the following processes. The processing circuit 1004 reads out the first video data and the second video data from the memories 1001 and 1002 at given timings determined by the output signal of the timing signal generator 706. The processing circuit 1004 includes a packet encoder which converts or encodes the first video data and the second video data into a stream of packets in response to the output signal of the timing signal generator 706. For example, every packet is loaded with at least one of a portion of the first video data and a portion of the second video data. Preferably, every packet contains an added information piece representing the format of the video data therein, an added information piece representing the identification number for the imaging device which causes the video data therein, and an added information piece representing the position of an image portion represented by the video data therein. The processing circuit 1004 outputs the packet stream to the bus I/F circuit 1005. The bus I/F circuit 1005 outputs the packet stream to the network.

As previously indicated, a cycle start packet (CSP) is periodically transmitted in the network. The bus I/F circuit 1005 receives every cycle start packet from the network. The bus I/F circuit 1005 generates a communication sync signal in response to the received cycle start packets. The communication sync signal is synchronized with the received cycle start packets. The bus I/F circuit 1005 outputs the communication sync signal to the timing signal generator 706.

Figure 13:
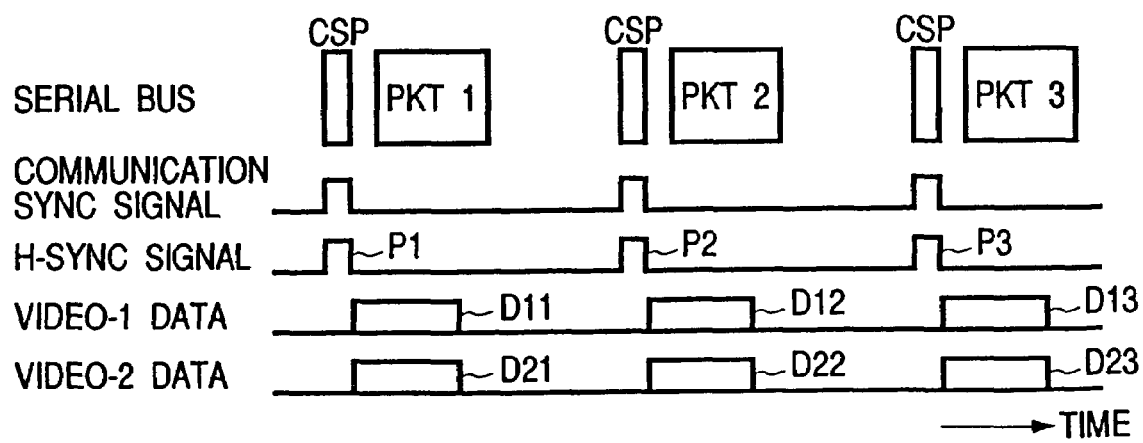
FIG. 13 is a time-domain diagram of signals and data in the system of FIG. 10.

Operation of the transceiver 705 will be explained in more detail. As shown in FIG. 13, a cycle start packet (CSP) is periodically transmitted in a serial bus of the network. The bus I/F circuit 1005 in the transceiver 705 detects every cycle start packet. The bus I/F circuit 1005 generates a communication sync signal in response to the detected cycle start packets. As shown in FIG. 13, the communication sync signal has a train of pulses synchronized with the respective cycle start packets. The bus I/F circuit 1005 outputs the communication sync signal to the timing signal generator 706. The timing signal generator 706 produces a horizontal sync signal in response to the communication sync signal. As shown in FIG. 13, the horizontal sync signal has a train of pulses (horizontal sync pulses) synchronized with respective pulses in the communication sync signal. The timing signal generator 706 outputs the horizontal sync signal to the drive circuit 707. The drive circuit 707 operates the imaging devices 701 and 702 in response to the horizontal sync signal. As previously indicated, the signal processor 703 converts the output signal of the imaging device 701 into a first digital video signal (first video data or video-1 data). The signal processor 704 converts the output signal of the imaging device 702 into a second digital video signal (second video data or video-2 data).

With reference to FIG. 13, the signal processor 703 outputs a 1-line-corresponding video-1 data piece D11 to the transceiver 705 in response to a first pulse P1 of the horizontal sync signal. The signal processor 704 outputs a 1-line-corresponding video-2 data piece D21 to the transceiver 705 in response to the first pulse P1 of the horizontal sync signal. The transceiver 705 generates a first packet PKT1 loaded with the video-1 data piece D11 and the video-2 data piece D21. The transceiver 705 outputs the first packet PKT1 to the serial bus of the network. The signal processor 703 outputs a 1-line-corresponding video-1 data piece D12 to the transceiver 705 in response to a second pulse P2 of the horizontal sync signal. The signal processor 704 outputs a 1-line-corresponding video-2 data piece D22 to the transceiver 705 in response to the second pulse P2 of the horizontal sync signal. The transceiver 705 generates a second packet PKT2 loaded with the video-1 data piece D12 and the video-2 data piece D22. The transceiver 705 outputs the second packet PKT2 to the serial bus of the network. The signal processor 703 outputs a 1-line-corresponding video-1 data piece D13 to the transceiver 705 in response to a third pulse P3 of the horizontal sync signal. The signal processor 704 outputs a 1-line-corresponding video-2 data piece D23 to the transceiver 705 in response to the third pulse P3 of the horizontal sync signal. The transceiver 705 generates a third packet PKT3 loaded with the video-1 data piece D13 and the video-2 data piece D23. The transceiver 705 outputs the third packet PKT3 to the serial bus of the network. These processes are periodically executed during a later stage.

It should be noted that two 1-line video data pieces originating from a common image source may be assigned to one packet. In this case, two pulses of a horizontal sync signal are generated in response to one cycle start packet.

Cycle start packets and pulses of the horizontal sync signal may be in a timing relation as "n:m" where "n" and "m" denote predetermined integers respectively.

The imaging devices 701 and 702 may be replaced by three or more imaging devices. The design of the system of FIG. 10 may be added to the system of FIG. 9.

Seventh Embodiment

Figure 14:
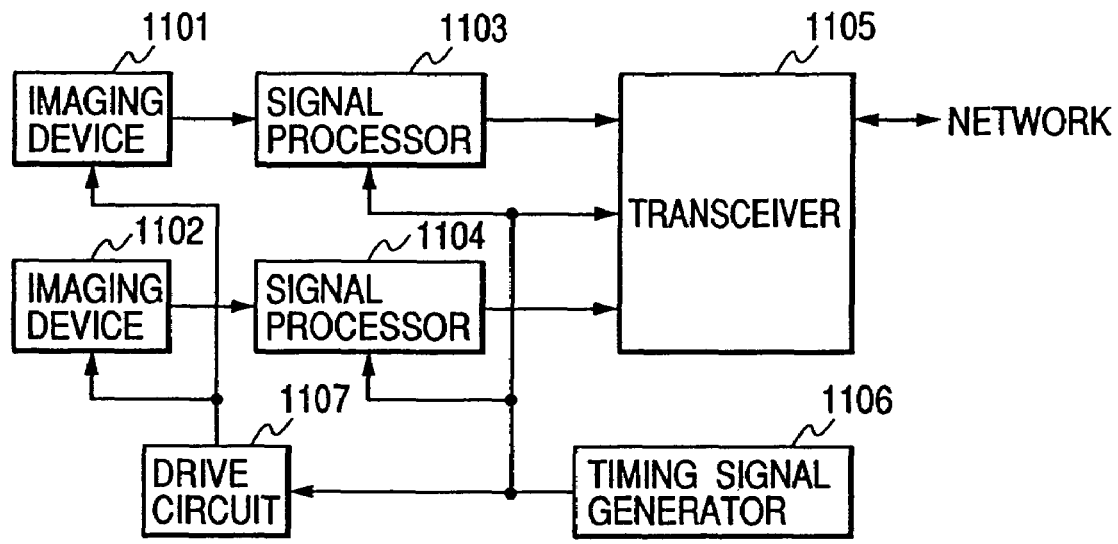
FIG. 14 is a block diagram of an image capture and transmission system according to a seventh embodiment of this invention.

FIG. 14 shows an image capture and transmission system according to a seventh embodiment of this invention. The system of FIG. 14 includes imaging devices (image sensors) 1101 and 1102, signal processors 1103 and 1104, a transceiver (a transmitter/receiver) 1105, a timing signal generator 1106, and a drive circuit 1107.

The imaging device 1101 is sequentially followed by the signal processor 1103 and the transceiver 1105. The imaging device 1102 is sequentially followed by the signal processor 1104 and the transceiver 1105. The timing signal generator 1106 is connected to the signal processors 1103 and 1104, the transceiver 1105, and the drive circuit 1107. The drive circuit 1107 is connected to the imaging devices 1101 and 1102. The transceiver 1105 is connected to a network including, for example, an IEEE 1394 serial bus.

The imaging device 1101, the imaging device 1102, the signal processor 1103, the signal processor 1104, the timing signal generator 1106, and the drive circuit 1107 are similar to the imaging device 101, the imaging device 102, the signal processor 103, the signal processor 104, the timing signal generator 106, and the drive circuit 107 in FIG. 1, respectively.

The signal processor 1103 outputs first video data to the transceiver 1105. The signal processor 1104 outputs second video data to the transceiver 1105.

The transceiver 1105 includes a packet encoder which converts or encodes the first video data and the second video data into a stream of packets in response to the output signal of the timing signal generator 1106. The transceiver 1105 outputs the packet stream to the network.

The transceiver 1105 is able to receive asynchronous packets from the network. The transceiver 1105 converts or decodes the received asynchronous packets into information pieces carried thereby.

Figure 15:
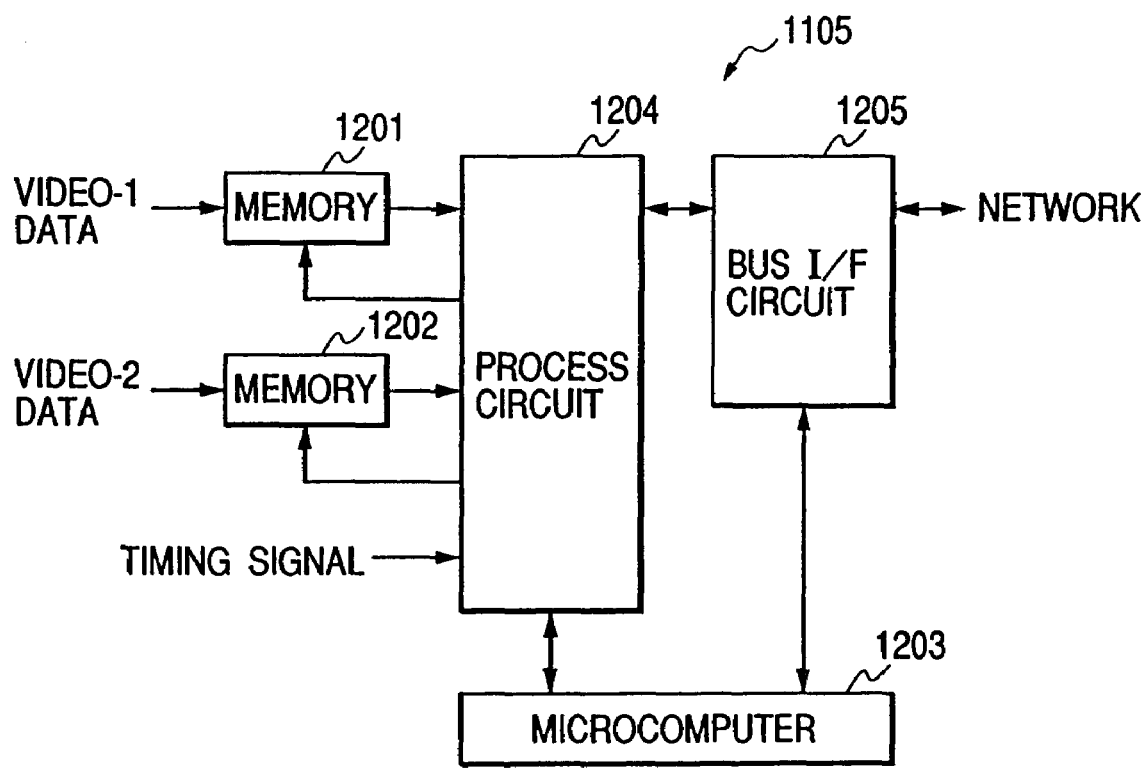
FIG. 15 is a block diagram of a transceiver in FIG. 14.

As shown in FIG. 15, the transceiver 1105 includes memories 1201 and 1202, a microcomputer 1203, a processing circuit 1204, and a bus I/F (interface) circuit 1205. The memory 1201 is connected to the signal processor 1103 (see FIG. 14) and the processing circuit 1204. The memory 1202 is connected to the signal processor 1104 (see FIG. 14) and the processing circuit 1204. The processing circuit 1204 is connected to the timing signal generator 1106 (see FIG. 14) and the bus I/F circuit 1205. The bus I/F circuit 1205 is connected to the network. The microcomputer 1203 is connected to the processing circuit 1204 and the bus I/F circuit 1205.

The first video data outputted from the signal processor 1103 is stored into the memory 1201. The second video data outputted from the signal processor 1104 is stored into the memory 1202. The microcomputer 1203 controls the processing circuit 1204 and the bus I/F circuit 1205 in accordance with a program stored therein. The program is designed to implement the following processes. The processing circuit 1204 reads out the first video data and the second video data from the memories 1201 and 1202 at given timings determined by the output signal of the timing signal generator 1106. The processing circuit 1204 includes a packet encoder which converts or encodes the first video data and the second video data into a stream of packets in response to the output signal of the timing signal generator 1106. For example, every packet is loaded with at least one of a portion of the first video data and a portion of the second video data. Preferably, every packet contains an added information piece representing the format of the video data therein, an added information piece representing the identification number for the imaging device which causes the video data therein, and an added information piece representing the position of an image portion represented by the video data therein. The processing circuit 1204 outputs the packet stream to the bus I/F circuit 1205. The bus I/F circuit 1205 outputs the packet stream to the network.

The microcomputer 1203 can transmit and receive asynchronous packets to and from an external apparatus via the network and the bus I/F circuit 1205.

The position of an image portion represented by a portion of the first video data read out from the memory 1201 can be changed by the microcomputer 1203. In addition, the position of an image portion represented by a portion of the second video data read out from the memory 1202 can be changed by the microcomputer 1203. Preferably, a control signal for determining the position of an image portion represented by a portion of the first video data read out from the memory 1201, and also a control signal for determining the position of an image portion represented by a portion of the second video data read out from the memory 1202 are transmitted to the microcomputer 1203 from the external apparatus via the network and the bus I/F circuit 1205. In this case, the control signals are carried by an asynchronous packet.

According to a first example, the memories 1201 and 1202 include FIFO (first in first out) memories respectively. Positions (storage locations) within the FIFO memory 1201 from which segments of the first video data are read out by the processing circuit 1204 can be shifted in accordance with a control signal outputted to the processing circuit 1204 from the microcomputer 1203. Alternatively, the timing at which the processing circuit 1204 accesses the FIFO memory 1201 can be changed in accordance with a control signal outputted to the processing circuit 1204 from the microcomputer 1203. In addition, positions (storage locations) within the FIFO memory 1202 from which segments of the second video data are read out by the processing circuit 1204 can be shifted in accordance with a second control signal outputted to the processing circuit 1204 from the microcomputer 1203. Alternatively, the timing at which the processing circuit 1204 accesses the FIFO memory 1202 can be changed in accordance with a control signal outputted to the processing circuit 1204 from the microcomputer 1203.

According to a second example, the memories 1201 and 1202 include RAM's (random access memories) respectively. Positions (storage locations) within the RAM 1201 from which segments of the first video data are read out by the processing circuit 1204 can be shifted in accordance with a control signal outputted to the processing circuit 1204 from the microcomputer 1203. A read start address in the RAM 1201 is equal to a fixed normal start address plus a variable address determined by the control signal outputted from the microcomputer 1203. In addition, positions (storage locations) within the RAM 1202 from which segments of the second video data are read out by the processing circuit 1204 can be shifted in accordance with a control signal outputted to the processing circuit 1204 from the microcomputer 1203. A read start address in the RAM 1202 is equal to a fixed normal start address plus a variable address determined by the control signal outputted from the microcomputer 1203.

It should be noted that the imaging devices 1101 and 1102 may be replaced by three or more imaging devices. The design of the system of FIG. 14 may be added to the system of FIG. 9.

Eighth Embodiment

Figure 16:
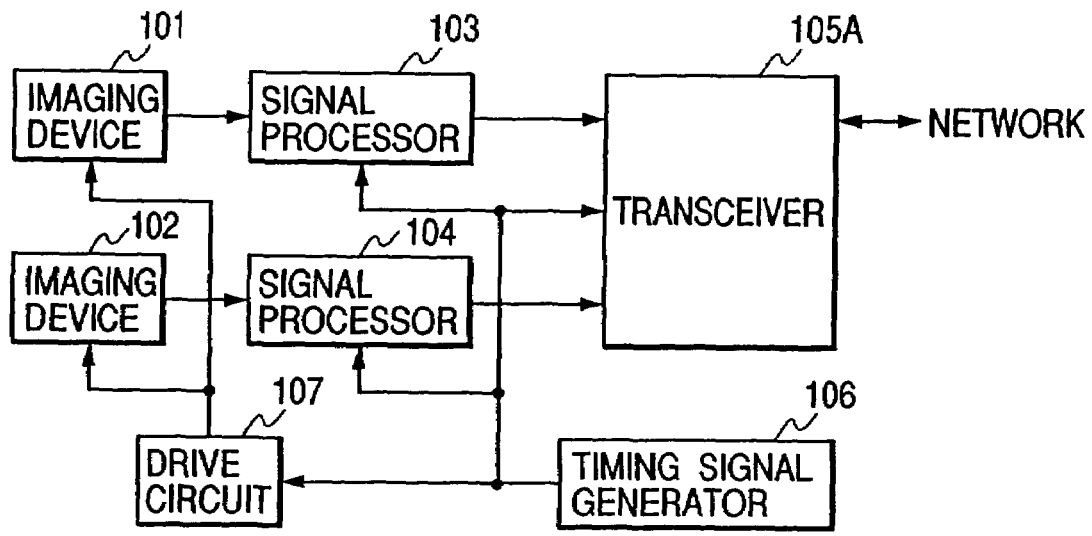
FIG. 16 is a block diagram of an image capture and transmission system according to an eighth embodiment of this invention.

FIG. 16 shows an image capture and transmission system according to an eighth embodiment of this invention. The system of FIG. 16 is similar to the system of FIG. 1 except that a transceiver 105A replaces the transceiver 105 (see FIG. 1).

Figure 17:
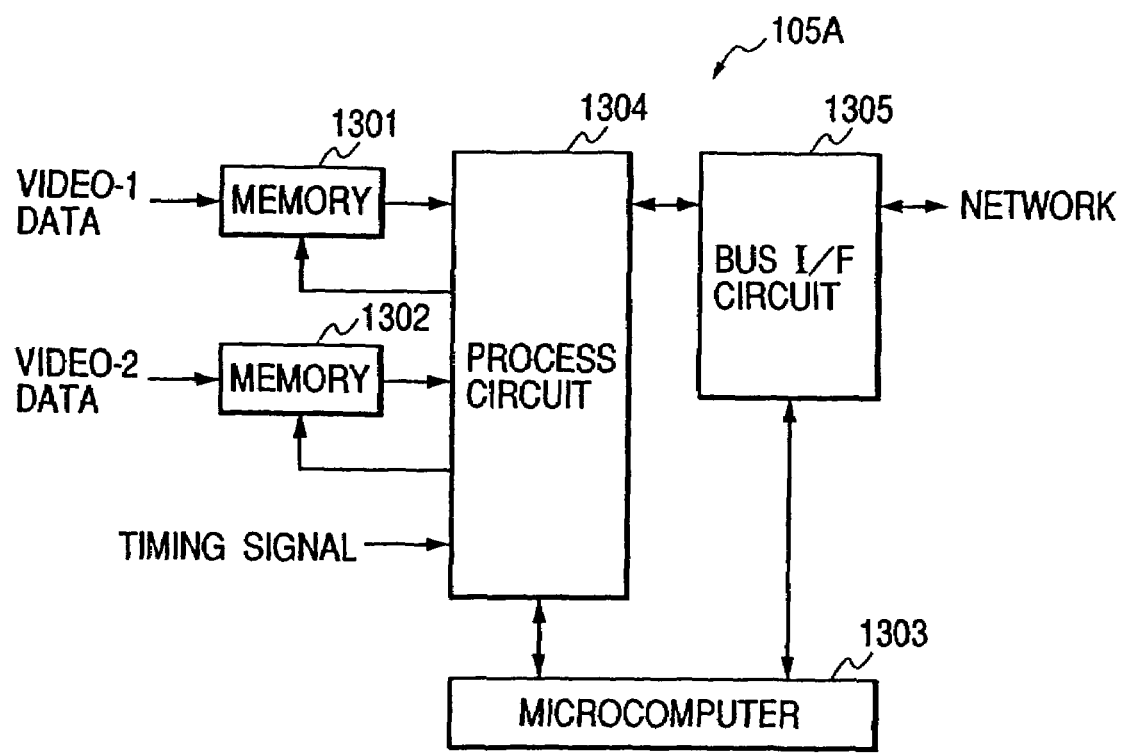
FIG. 17 is a block diagram of a transceiver in FIG. 16.

As shown in FIG. 17, the transceiver 105A includes memories 1301 and 1302, a microcomputer 1303, a processing circuit 1304, and a bus I/F (interface) circuit 1305. The memory 1301 is connected to a signal processor 103 (see FIG. 16) and the processing circuit 1304. The memory 1302 is connected to a signal processor 104 (see FIG. 16) and the processing circuit 1304. The processing circuit 1304 is connected to a timing signal generator 106 (see FIG. 16) and the bus I/F circuit 1305. The bus I/F circuit 1305 is connected to a network. The microcomputer 1303 is connected to the processing circuit 1304 and the bus I/F circuit 1305.

First video data outputted from the signal processor 103 is stored into the memory 1301. Preferably, the memory 1301 has a recording capacity corresponding to at least one frame. Second video data outputted from the signal processor 104 is stored into the memory 1302. Preferably, the memory 1302 has a recording capacity corresponding to at least one frame. The microcomputer 1303 controls the processing circuit 1304 and the bus I/F circuit 1305 in accordance with a program stored therein. The program is designed to implement the following processes. The processing circuit 1304 reads out the first video data and the second video data from the memories 1301 and 1302 at given timings determined by the output signal of the timing signal generator 106. The processing circuit 1304 includes a packet encoder which converts or encodes the first video data and the second video data into a stream of packets in response to the output signal of the timing signal generator 106. For example, every packet is loaded with at least one of a portion of the first video data and a portion of the second video data. Preferably, every packet contains an added information piece representing the format of the video data therein, an added information piece representing the identification number for the imaging device which causes the video data therein, and an added information piece -representing the position of an image portion represented by the video data therein. The processing circuit 1304 outputs the packet stream to the bus I/F circuit 1305. The bus I/F circuit 1305 outputs the packet stream to the network.

The microcomputer 1303 can transmit and receive asynchronous packets to and from an external apparatus via the network and the bus I/F circuit 1305.

A reception side connected to the network decides whether or not every packet in the packet stream from the system of FIG. 16 has been successfully received. If it is decided that a packet has not been successfully received, the reception side returns an asynchronous packet of a re-transmission request to the system of FIG. 16 via the network. The microcomputer 1303 receives the re-transmission request packet via the bus I/F circuit 1305. The microcomputer 1303 recovers the re-transmission request from the received packet. The microcomputer 1303 controls the processing circuit 1304 in response to the re-transmission request to execute the transmission of the last packet again. The check and re-transmission on the packet-by-packet basis may be replaced by check and re-transmission on a frame-by-frame basis.

Alternatively, every 1-frame-corresponding portion of the first video data and every 1-frame-corresponding portion of the second video data may be re-transmitted from the memories 1301 and 1302 to the network via the processing circuit 1304 and the bus I/F circuit 1305. In this case, it is unnecessary for a reception side to return a re-transmission request even if a portion of a packet stream has not been successfully received.

It should be noted that imaging devices 101 and 102 may be replaced by three or more imaging devices. The design of the system of FIG. 16 may be added to the system of FIG. 9 or the system of FIG. 14.

Ninth Embodiment

Figure 18:
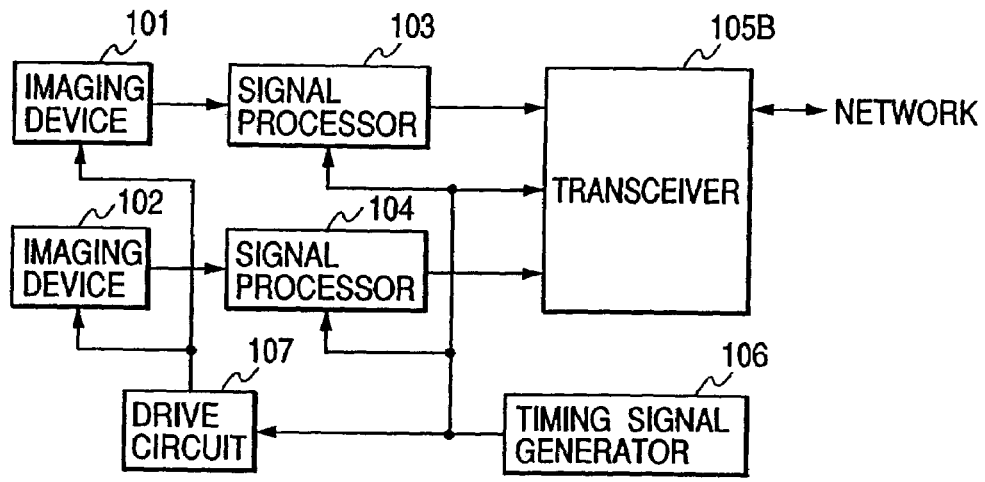
FIG. 18 is a block diagram of an image capture and transmission system according to a ninth embodiment of this invention.

FIG. 18 shows an image capture and transmission system according to a ninth embodiment of this invention. The system of FIG. 18 is similar to the system of FIG. 1 except that a transceiver 105B replaces the transceiver 105 (see FIG. 1).

Figure 19:
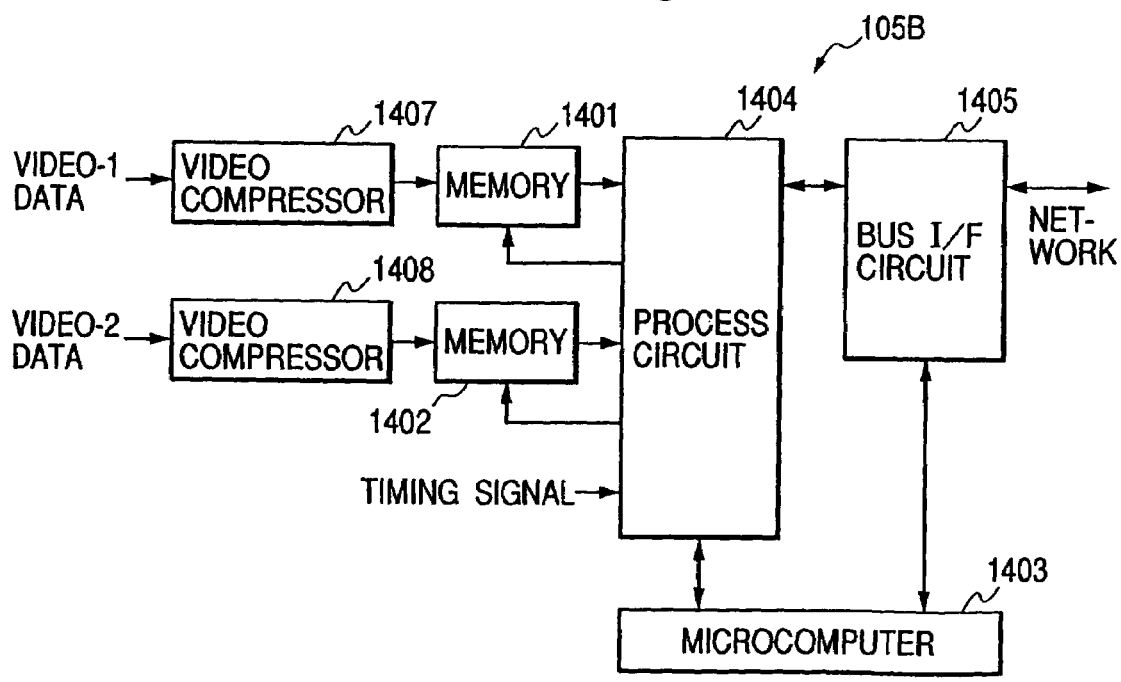
FIG. 19 is a block diagram of a transceiver in FIG. 18.

As shown in FIG. 19, the transceiver 105B includes memories 1401 and 1402, a microcomputer 1403, a processing circuit 1404, a bus I/F (interface) circuit 1405, and video compressors 1407 and 1408. The video compressor 1407 is connected between a signal processor 103 (see FIG. 18) and the memory 1401. The memory 1401 is connected to the processing circuit 1404. The video compressor 1408 is connected between a signal processor 104 (see FIG. 18) and the memory 1402. The memory 1402 is connected to the processing circuit 1404. The processing circuit 1404 is connected to a timing signal generator 106 (see FIG. 18) and the bus I/F circuit 1405. The bus I/F circuit 1405 is connected to a network. The microcomputer 1403 is connected to the processing circuit 1404 and the bus I/F circuit 1405.

The video compressor 1407 receives first video data from the signal processor 108, and compresses the first video data into first compression-resultant video data. The video compressor 1407 outputs the first compression-resultant video data. The first compression-resultant video data is stored into the memory 1401. The video compressor 1408 receives second video data from the signal processor 104, and compresses the second video data into second compression-resultant video data. The video compressor 1408 outputs the second compression-resultant video data. The second compression-resultant video data is stored into the memory 1402. The microcomputer 1403 controls the processing circuit 1404 and the bus I/F circuit 1405 in accordance with a program stored therein. The program is designed to implement the following processes. The processing circuit 1404 reads out the first compression-resultant video data and the second compression-resultant video data from the memories 1401 and 1402 at given timings determined by the output signal of the timing signal generator 106. The processing circuit 1404 includes a packet encoder which converts or encodes the first compression-resultant video data and the second compression-resultant video data into a stream of packets in response to the output signal of the timing signal generator 106. For example, every packet is loaded with at least one of a portion of the first compression-resultant video data and a portion of the second compression-resultant video data. Preferably, every packet contains an added information piece representing the format of the video data therein, an added information piece representing the identification number for the imaging device which causes the video data therein, and an added information piece representing the position of an image portion represented by the video data therein. The processing circuit 1404 outputs the packet stream to the bus I/F circuit 1405. The bus I/F circuit 1405 outputs the packet stream to the network.

The microcomputer 1403 can transmit and receive asynchronous packets to and from an external apparatus via the network and the bus I/F circuit 1405.

It should be noted that imaging devices 101 and 102 may be replaced by three or more imaging devices. The design of the system of FIG. 18 may be added to the system of FIG. 9, the system of FIG. 14, or the system of FIG. 16.

Tenth Embodiment

Figure 20:
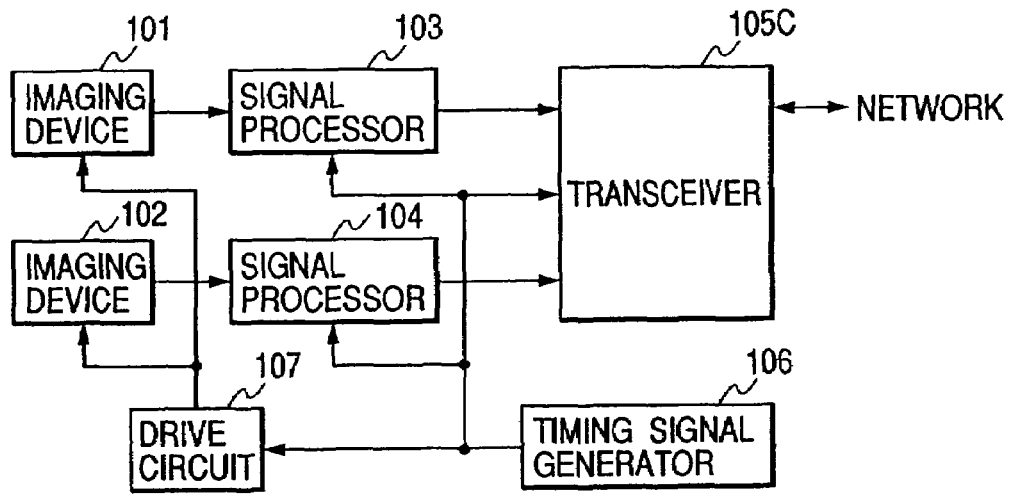
FIG. 20 is a block diagram of an image capture and transmission system according to a tenth embodiment of this invention.

FIG. 20 shows an image capture and transmission system according to a tenth embodiment of this invention. The system of FIG. 20 is similar to the system of FIG. 1 except that a transceiver 105C replaces the transceiver 105 (see FIG. 1).

Figure 21:
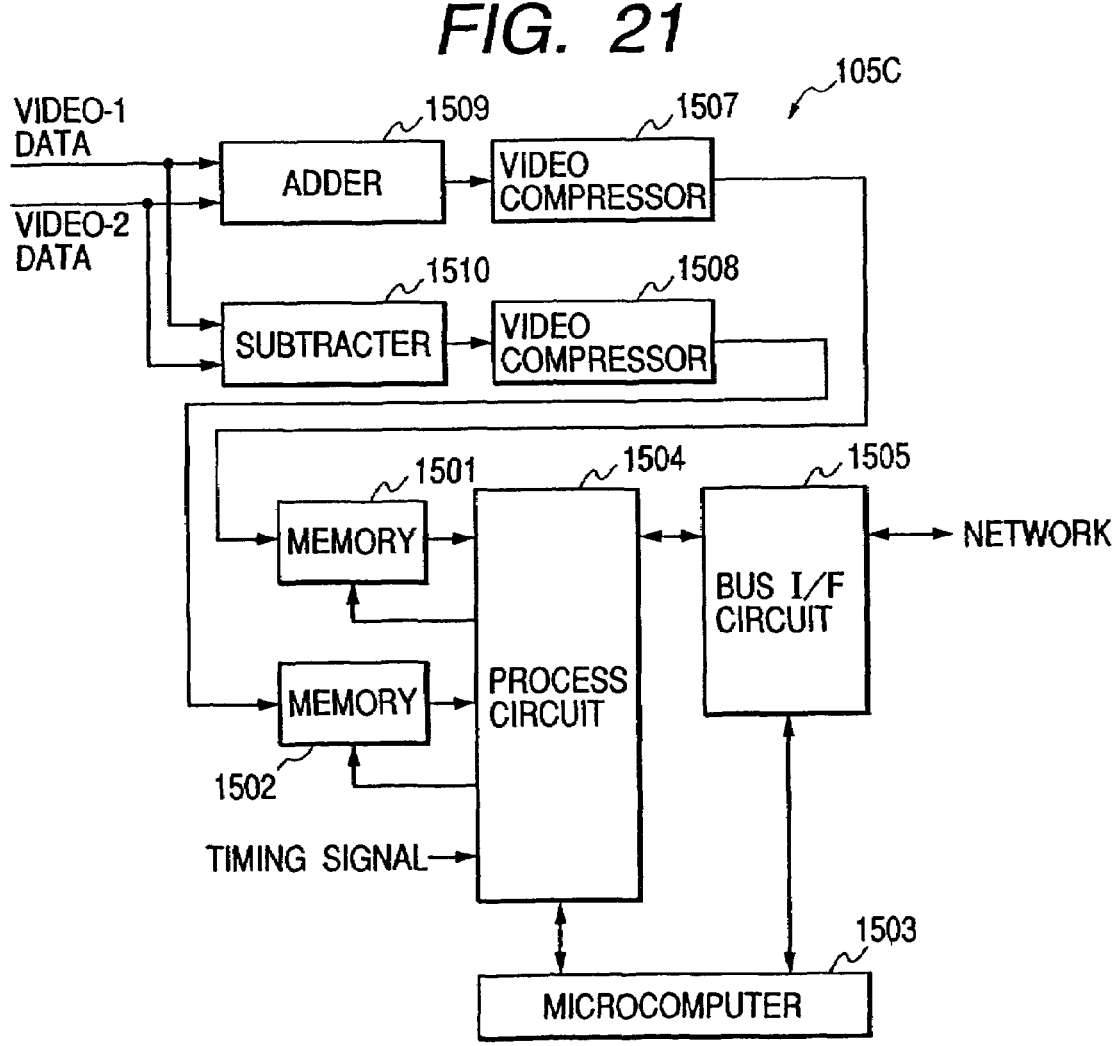
FIG. 21 is a block diagram of a transceiver in FIG. 20.

As shown in FIG. 21, the transceiver 105C includes memories 1501 and 1502, a microcomputer 1503, a processing circuit 1504, a bus I/F (interface) circuit 1505, video compressors 1507 and 1508, an adder 1509, and a subtracter 1510. The adder 1509 is connected to signal processors 103 and 104 (see FIG. 20). The adder 1509 is connected to the video compressor 1507. The video compressor 1507 is connected to the memory 1501. The memory 1501 is connected to the processing circuit 1504. The subtracter 1510 is connected to the signal processors 103 and 104 (see FIG. 20). The subtracter 1510 is connected to the video compressor 1508. The video compressor 1508 is connected to the memory 1502. The memory 1502 is connected to the processing circuit 1504. The processing circuit 1504 is connected to a timing signal generator 106 (see FIG. 20) and the bus I/F circuit 1505. The bus I/F circuit 1505 is connected to a network. The microcomputer 1503 is connected to the processing circuit 1504 and the bus I/F circuit 1505.

The adder 1509 receives first video data from the signal processor 103. The adder 1509 receives second video data from the signal processor 104. The device 1509 adds the first video data and the second video data into addition-resultant video data. The adder 1509 outputs the addition-resultant video data to the video compressor 1507. The device 1507 compresses the addition-resultant video data into first compression-resultant video data. The video compressor 1507 outputs the first compression-resultant video data. The first compression-resultant video data is stored into the memory 1501. The subtracter 1510 receives the first video data from the signal processor 103. The subtracter 1510 receives the second video data from the signal processor 104. The device 1510 executes subtraction between the first video data and the second video data, thereby generating subtraction-resultant video data. The subtracter 1510 outputs the subtraction-resultant video data to the video compressor 1508. The device 1508 compresses the subtraction-resultant video data into second compression-resultant video data. The video compressor 1508 outputs the second compression-resultant video data. The second compression-resultant video data is stored into the memory 1502. The microcomputer 1503 controls the processing circuit 1504 and the bus I/F circuit 1505 in accordance with a program stored therein. The program is designed to implement the following processes. The processing circuit 1504 reads out the first compression-resultant video data and the second compression-resultant video data from the memories 1501 and 1502 at given timings determined by the output signal of the timing signal generator 106. The processing circuit 1504 includes a packet encoder which converts or encodes the first compression-resultant video data and the second compression-resultant video data into a stream of packets in response to the output signal of the timing signal generator 106. For example, every packet is loaded with at least one of a portion of the first compression-resultant video data and a portion of the second compression-resultant video data. Preferably, every packet contains an added information piece representing the format of the video data therein, an added information piece representing the identification number for the imaging device which causes the video data therein, and an added information piece representing the position of an image portion represented by the video data therein. The processing circuit 1504 outputs the packet stream to the bus I/F circuit 1505. The bus I/F circuit 1505 outputs the packet stream to the network.

The microcomputer 1503 can transmit and receive asynchronous packets to and from an external apparatus via the network and the bus I/F circuit 1505.

It should be noted that image-position correcting circuits may be provided at stages before the adder 1509 and the subtracter 1510 to remove a positional error between the first video data and the second video data inputted into the adder 1509 and the subtracter 1510.

It should be noted that imaging devices 101 and 102 may be replaced by three or more imaging devices. The design of the system of FIG. 20 may be added to the system of FIG. 9, the system of FIG. 14, or the system of FIG. 16.

Eleventh Embodiment

Figure 22:
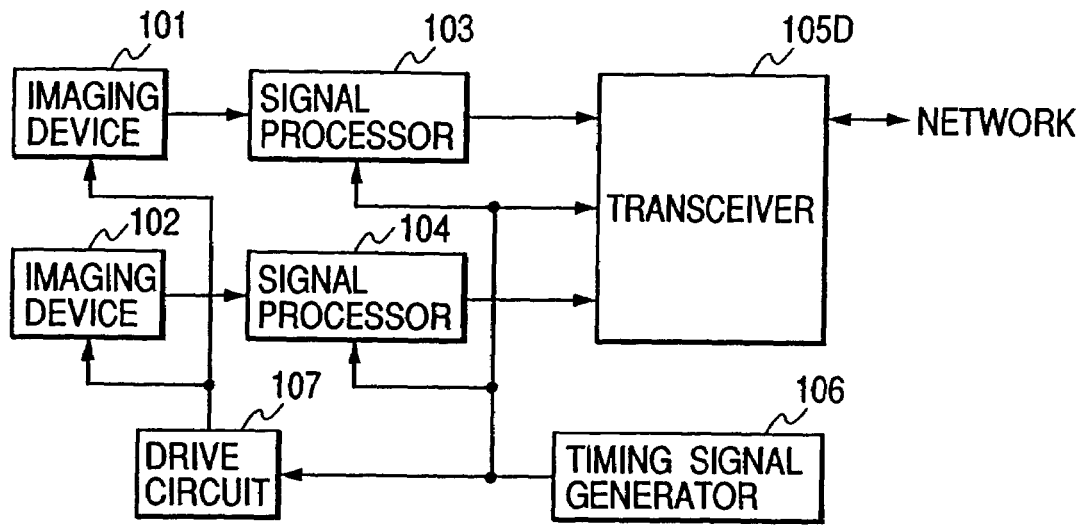
FIG. 22 is a block diagram of an image capture and transmission system according to an eleventh embodiment of this invention.

FIG. 22 shows an image capture and transmission system according to an eleventh embodiment of this invention. The system of FIG. 22 is similar to the system of FIG. 1 except that a transceiver 105D replaces the transceiver 105 (see FIG. 1).

Figure 23:
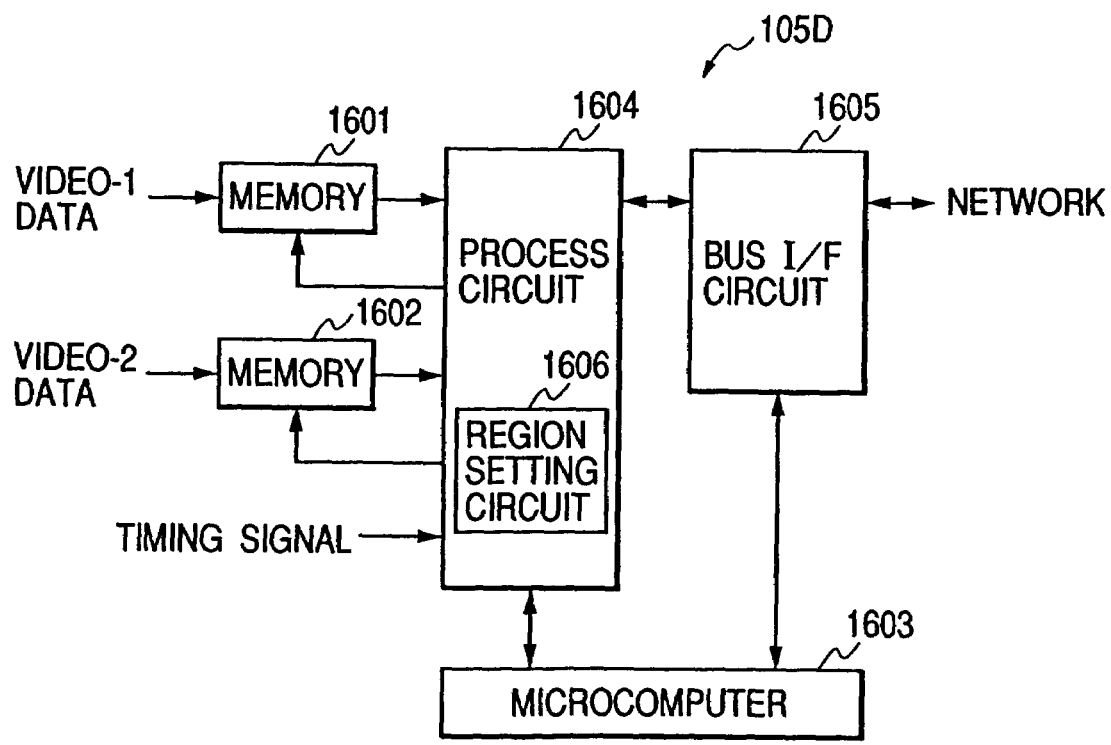
FIG. 23 is a block diagram of a transceiver in FIG. 22.

As shown in FIG. 23, the transceiver 105D includes memories 1601 and 1602, a microcomputer 1603, a processing circuit 1604, and a bus I/F (interface) circuit 1605. The memory 1601 is connected to a signal processor 103 (see FIG. 22) and the processing circuit 1604. The memory 1602 is connected to a signal processor 104 (see FIG. 22) and the processing circuit 1604. The processing circuit 1604 is connected to a timing signal generator 106 (see FIG. 22) and the bus I/F circuit 1605. The bus I/F circuit 1605 is connected to a network. The microcomputer 1603 is connected to the processing circuit 1604 and the bus I/F circuit 1605.

First video data outputted from the signal processor 103 is stored into the memory 1601. Second video data outputted from the signal processor 104 is stored into the memory 1602. The microcomputer 1603 controls the processing circuit 1604 and the bus I/F circuit 1605 in accordance with a program stored therein. The program is designed to implement the following processes. The processing circuit 1604 reads out the first video data and the second video data from the memories 1601 and 1602 at given timings determined by the output signal of the timing signal generator 106. The processing circuit 1604 includes a packet encoder which converts or encodes the first video data and the second video data into a stream of packets in response to the output signal of the timing signal generator 106. For example, every packet is loaded with at least one of a portion of the first video data and a portion of the second video data. Preferably, every packet contains an added information piece representing the format of the video data therein, an added information piece representing the identification number for the imaging device which causes the video data therein, and an added information piece representing the position of an image portion represented by the video data therein. The processing circuit 1604 outputs the packet stream to the bus I/F circuit 1605. The bus I/F circuit 1605 outputs the packet stream to the network.

The microcomputer 1603 can transmit and receive asynchronous packets to and from an external apparatus via the network and the bus I/F circuit 1605.

Figure 24:
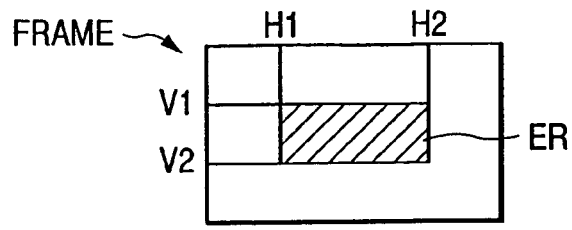
FIG. 24 is a diagram of a frame and an effective region.

The processing circuit 1604 includes a region setting circuit or a masking circuit 1606. The region setting circuit 1606 determines an effective region ER in every frame represented by each of the first video data and the second video data. As shown in FIG. 24, the effective region ER is rectangular. The effective region ER extends between horizontal limit positions (horizontal limit pixel position values) H1 and H2. The effective region ER extends between vertical limit positions (vertical limit pixel position values) V1 and V2.

Figure 25:
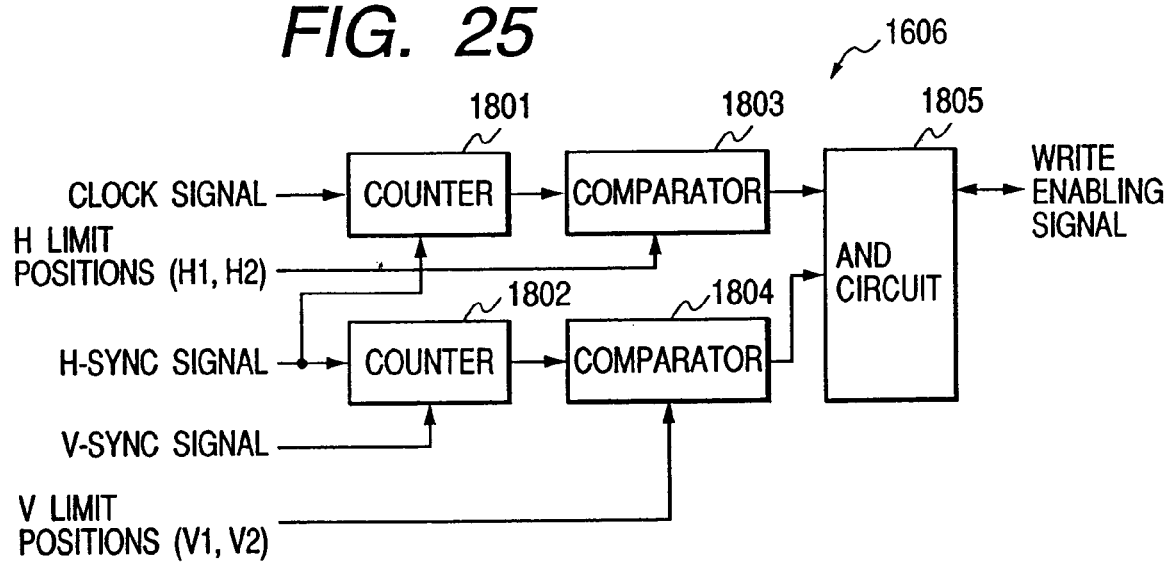
FIG. 25 is a block diagram of a region setting circuit in FIG. 23.

As shown in FIG. 25, the region setting circuit 1606 includes counters 1801 and 1802, comparators 1803 and 1804, and an AND circuit 1805. The counters 1801 and 1802 are connected to the timing signal generator 106. The counter 1801 is connected to the comparator 1803. The comparator 1803 is connected to the microcomputer 1603 and the AND circuit 1805. The counter 1802 is connected to the comparator 1804. The comparator 1804 is connected to the microcomputer 1603 and the AND circuit 1805. The AND circuit 1805 is connected to the memories 1601 and 1602.

The counter 1801 receives a clock signal and a horizontal sync signal from the timing signal generator 106. The device 1801 counts pulses of the clock signal. The counter 1801 outputs a count-result signal to the comparator 1803 which represents a currently-accessed horizontal point (a currently-scanned horizontal point) within every frame. The counter 1801 is reset in response to every pulse of the horizontal sync signal. The comparator 1803 is informed of the horizontal limit positions H1 and H2 by the microcomputer 1603. The comparator 1803 decides whether or not the currently-accessed horizontal point represented by the output signal of the counter 1801 is between the horizontal limit positions H1 and H2. When the currently-accessed horizontal point is between the horizontal limit positions H1 and H2, the comparator 1803 outputs a "1" signal (a high-level signal) to the AND circuit 1805. Otherwise, the comparator 1803 outputs a "0" signal (a low-level signal) to the AND circuit 1805.

The counter 1802 receives the horizontal sync signal from the timing signal generator 106. In addition, the counter 1802 receives a vertical sync signal from the timing signal generator 106. The device 1802 counts pulses of the horizontal sync signal. The counter 1802 outputs a count-result signal to the comparator 1804 which represents a currently-accessed vertical point (a currently-scanned vertical point) within every frame. The counter 1802 is reset in response to every pulse of the vertical sync signal. The comparator 1804 is informed of the vertical limit positions V1 and V2 by the microcomputer 1603. The comparator 1804 decides whether or not the currently-accessed vertical point represented by the output signal of the counter 1802 is between the vertical limit positions V1 and V2. When the currently-accessed vertical point is between the vertical limit positions V1 and V2, the comparator 1804 outputs a "1" signal (a high-level signal) to the AND circuit 1805. Otherwise, the comparator 1804 outputs a "0" signal (a low-level signal) to the AND circuit 1805.

When both the output signals of the comparators 1803 and 1804 are "1", that is, when the currently-accessed point is in the effective region ER, the AND circuit 1805 outputs a write enabling signal of "1" (a high-level state) to the memories 1601 and 1602. Otherwise, the AND circuit 1805 outputs a write enabling signal of "0" (a low-level state) to the memories 1601 and 1602. When the write enabling signal is "1", the writing of the first video data into the memory 1601 is permitted. When the write enabling signal is "0", the writing of the first video data into the memory 1601 is inhibited. When the write enabling signal is "1", the writing of the second video data into the memory 1602 is permitted. When the write enabling signal is "0", the writing of the second video data into the memory 1602 is inhibited.

Accordingly, every portion of the first video data which corresponds to the effective region ER is selected, and only the selected potion of the first video data Is transmitted to the network. Also, every portion of the second video data which corresponds to the effective region ER is selected, and only the selected potion of the second video data is transmitted to the network.

Different effective regions may be set for the first video data and the second video data, respectively. In this case, the processing circuit 1604 is provided with two region setting circuits which relate to the first video data and the second video data respectively.

It should be noted that imaging devices 101 and 102 may be replaced by three or more imaging devices. The design of the system of FIG. 22 may be added to the system of FIG. 9, the system of FIG. 14, the system of FIG. 16, or the system of FIG. 18.

Twelfth Embodiment

A twelfth embodiment of this intention is similar to the eleventh embodiment thereof except for design changes indicated hereinafter.

In the twelfth embodiment, the microcomputer 1603 (see FIG. 23) receives the first video data and the second video data from the processing circuit 1604 (see FIG. 23). The microcomputer 1603 processes the first video data and the second video data to search frames represented thereby for a predetermined target object. The microcomputer 1603 generates a first search-result information piece indicating whether or not the target object is present in or absent from every frame. In the case where the target object is present in a frame, the microcomputer 1603 generates a second search-result information piece indicating the position and the size of the target object. The microcomputer 1603 determines the effective region ER in response to the generated first and second search-result information pieces. Specifically, the microcomputer 1603 determines the horizontal limit positions H1 and H2, and the vertical limit positions V1 and V2 in response to the generated first and second search-result information pieces.

It should be noted that the previously-mentioned target-object searching process may be implemented by an exclusive video data processor. Also, the previously-mentioned process of determining the effective region ER, that is, the previously-mentioned process of determining the horizontal limit positions H1 and H2, and the vertical limit positions V1 and V2, may be implemented by an exclusive region designating circuit.

Figure 26:
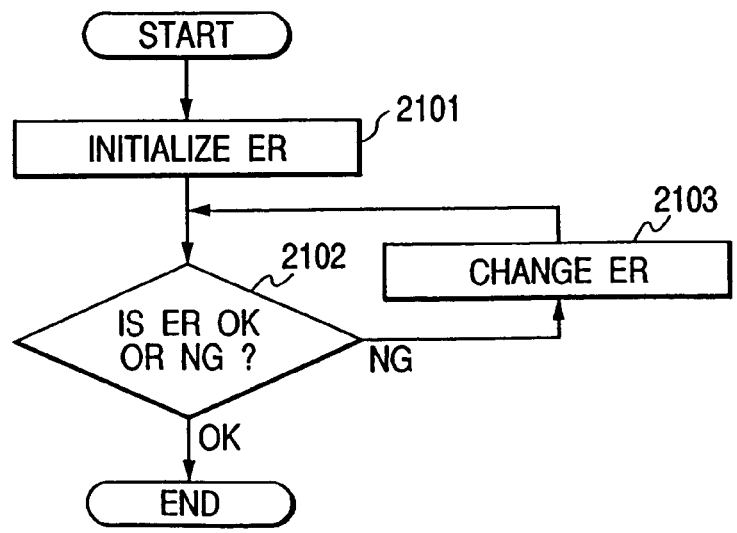
FIG. 26 is a flowchart of a segment of a program in a microcomputer in a twelfth embodiment of this invention.

FIG. 26 is a flowchart of a segment of the program in the microcomputer 1603 which relates to the determination of the effective region ER.

As shown in FIG. 26, a first step 2101 of the program segment sets the effective region ER to a predetermined initial region. After the step 2101, the program advances to a step 2102.

The step 2102 decides whether or not the effective region ER is acceptable or unacceptable on the basis of, for example, the first and second search-result information pieces. When the effective region ER is decided to be acceptable, the program exits from the step 2102 and then the current execution cycle of the program segment ends. In this case, the acceptable effective region ER is actually used. When the effective region ER is decided to be unacceptable, the program advances from the step 2102 to a step 2103.

The step 2103 updates the effective region ER in response to the first and second search-result information pieces. Specifically, the step 2103 updates the horizontal limit positions H1 and H2, and the vertical limit positions V1 and V2 in response to the first and second search-resultant information pieces. The updating of the effective region ER includes moving the effective region ER or changing the effective region ER in at least one of position and size. Preferably, the updating of the effective region ER is designed to relatively move the target object toward the center of the effective region ER. After the step 2103, the program returns to the step 2102.

According to a first example, the initial effective region agrees with a whole frame represented by each of the first video data and the second video data outputted from the signal processors 103 and 104 (see FIG. 22). The effective region ER is changed or moved from the initial region in response to the position and the size of the target object.

According to a second example, the initial effective region agrees with an upper edge region in a frame. The effective region ER is moved from the initial region so that the target object will be centered thereat.

It should be noted that the imaging devices 101 and 102 (see FIG. 22) may be replaced by three or more imaging devices. Control information for determining the effective region ER may be transmitted to the microcomputer 1603 (see FIG. 23) from an external apparatus via the network and the bus I/F circuit 1605 (see FIG. 23).

Thirteenth Embodiment

A thirteenth embodiment of this invention is similar to the twelfth embodiment thereof except for design changes indicated hereinafter.

The thirteenth embodiment includes a device having a sensing function of detecting an object whose image is to be captured. For example, the object is a person. The sensing function provides information of the detected object. In the thirteenth embodiment, the effective region ER is determined in response to the information of the detected object.

It should be noted that information of an object may be may be transmitted from an external apparatus via the network.

What is claimed is:

1. An image capture and transmission system comprising:
first and second imaging devices;
first means for generating a timing signal;
a common drive circuit for driving the first and second imaging devices at equal timings determined by the timing signal generated by the first means;
a first signal processor for converting an output signal of the first imaging device into first digital video data corresponding to a frame;
a second signal processor for converting an output signal of the second imaging device into second digital video data corresponding to a frame;
second means for setting at least one changeable effective region, having a size smaller than that of a frame, in every frame presented by the first digital video data and the second digital video data, selecting portions of the first digital video data and the second digital video data placed in the effective region in every frame, and processing only the selected portions of the first digital video data and the second digital video data into a stream of packets; and
third means for transmitting the packet stream generated by the second means.

2. An image capture and transmission system as recited in claim 1, wherein the effective region in every frame is rectangular, and extends between horizontal limit positions and extends between vertical limit positions.

3. An image capture and transmission system as recited in claim 1, further comprising means for searching every frame represented by the first digital video data and the second digital video data for a predetermined target object, and means for changing the effective region in every frame in response to a result of the searching.

4. An image capture and transmission system as recited in claim 1, further comprising means for sensing a specified object in every frame represented by the first digital video data and the second digital video data, and generating information of a result of the sensing, means provided in the second means for automatically setting the effective region in every frame in accordance with a variable setting condition, and means for deciding the setting condition in response to the information of the result of the sensing.

5. An image capture and transmission system as recited in claim 1, further comprising means for sensing a specified object in every frame represented by the first digital video data and the second digital video data, and generating information of a result of the sensing, and means for changing the effective region in every frame in response to the information of the result of the sensing.

* * * * *

UNITED STATES PATENT AND TRADEMARK OFFICE
CERTIFICATE OF CORRECTION

| | | |
|---|---|---|
| PATENT NO. | : 7,239,663 B2 | Page 1 of 1 |
| APPLICATION NO. | : 10/626567 | |
| DATED | : July 3, 2007 | |
| INVENTOR(S) | : Kengo Tsuzuki and Toshiaki Shinohara | |

It is certified that error appears in the above-identified patent and that said Letters Patent is hereby corrected as shown below:

Add the following to the Title Page:

(62)          Related U.S. Application Data

Division of application No. 09/315,062 filed on May 20, 1999, now Pat. No. 6,625,220

(30)          Foreign Application Priority Data

Jul. 10, 1998    (JP) .................................................................. 10-196283

Signed and Sealed this

Fourth Day of September, 2007

JON W. DUDAS
*Director of the United States Patent and Trademark Office*